United States Patent
Ichieda

(10) Patent No.: US 12,542,881 B2
(45) Date of Patent: Feb. 3, 2026

(54) PROJECTION METHOD AND PROJECTION SYSTEM

(71) Applicant: SEIKO EPSON CORPORATION, Tokyo (JP)

(72) Inventor: Hiroyuki Ichieda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 345 days.

(21) Appl. No.: 18/227,611

(22) Filed: Jul. 28, 2023

(65) Prior Publication Data

US 2024/0040092 A1  Feb. 1, 2024

(30) Foreign Application Priority Data

Jul. 29, 2022  (JP) ................. 2022-121348

(51) Int. Cl.
 *H04N 9/31* (2006.01)
 *G03B 21/14* (2006.01)
(52) U.S. Cl.
 CPC ......... *H04N 9/3185* (2013.01); *H04N 9/3141* (2013.01); *H04N 9/3194* (2013.01)
(58) Field of Classification Search
 CPC .. H04N 9/3188; H04N 9/3194; H04N 9/3179; G03B 21/14
 See application file for complete search history.

(56) References Cited

U.S. PATENT DOCUMENTS

| 2012/0127261 | A1 | 5/2012 | Okada |
| 2019/0313055 | A1 | 10/2019 | Miki et al. |
| 2023/0102878 | A1* | 3/2023 | Wang .................. G01S 7/4915 |
| | | | 348/744 |

FOREIGN PATENT DOCUMENTS

| JP | 2009-194498 A | 8/2009 |
| JP | 2011-023886 A | 2/2011 |
| JP | 2020-167614 A | 10/2020 |
| WO | 2018/025458 A1 | 2/2018 |

* cited by examiner

*Primary Examiner* — Ryan D Howard
(74) *Attorney, Agent, or Firm* — Oliff PLC

(57) ABSTRACT

A projection method includes generating projection size information representing a dimension of a first projection image displayed on a projection surface based on information output from a sensor, obtaining a first image including a first human image representing a person, generating a third image including a second image which is obtained by adjusting a size of the first human image based on the projection size information, and projecting the third image to thereby display a second projection image on the projection surface.

9 Claims, 10 Drawing Sheets

PROJECTION METHOD AND PROJECTION SYSTEM

The present application is based on, and claims priority from JP Application Serial Number 2022-121348, filed Jul. 29, 2022, the disclosure of which is hereby incorporated by reference herein in its entirety.

BACKGROUND

1. Technical Field

The present disclosure relates to a projection method and a projection system.

2. Related Art

There has been developed a technology of adjusting a size of a human image included in a photograph or the like to thereby display the human image in a specific size such as life size. In, for example, International Patent Publication No. WO 2018/025458 (Document 1), there is disclosed an information processing device which displays the human image on a display panel in life size.

In Document 1, there is no supposition of a usage of a display device in which the size of the image to be displayed changes in accordance with installation circumstances, such as a projector. Therefore, when displaying the human image in a desired size using the information processing device described in Document 1 and the projector, it is necessary to adjust the installation circumstances such as a distance between the projector and a projection surface, which is burdensome.

SUMMARY

A projection method according to an aspect of the present disclosure includes generating projection size information representing a dimension of a first projection image displayed on a projection surface based on information output from a sensor, obtaining a first image including a first human image representing a person, generating a third image including a second image which is obtained by adjusting a size of the first human image based on the projection size information, and projecting the third image to thereby display a second projection image on the projection surface.

A projection system according to an aspect of the present disclosure includes a processing device, a sensor, and a projection mechanism, wherein the processing device executes generating projection size information representing a dimension of a first projection image displayed on a projection surface based on information output from a sensor, obtaining a first image including a first human image representing a person, generating a third image including a second image which is obtained by adjusting a size of the first human image based on the projection size information, and making the projection mechanism project the third image to thereby display a second projection image on the projection surface.

DESCRIPTION OF AN EXEMPLARY EMBODIMENT

Figure 1:
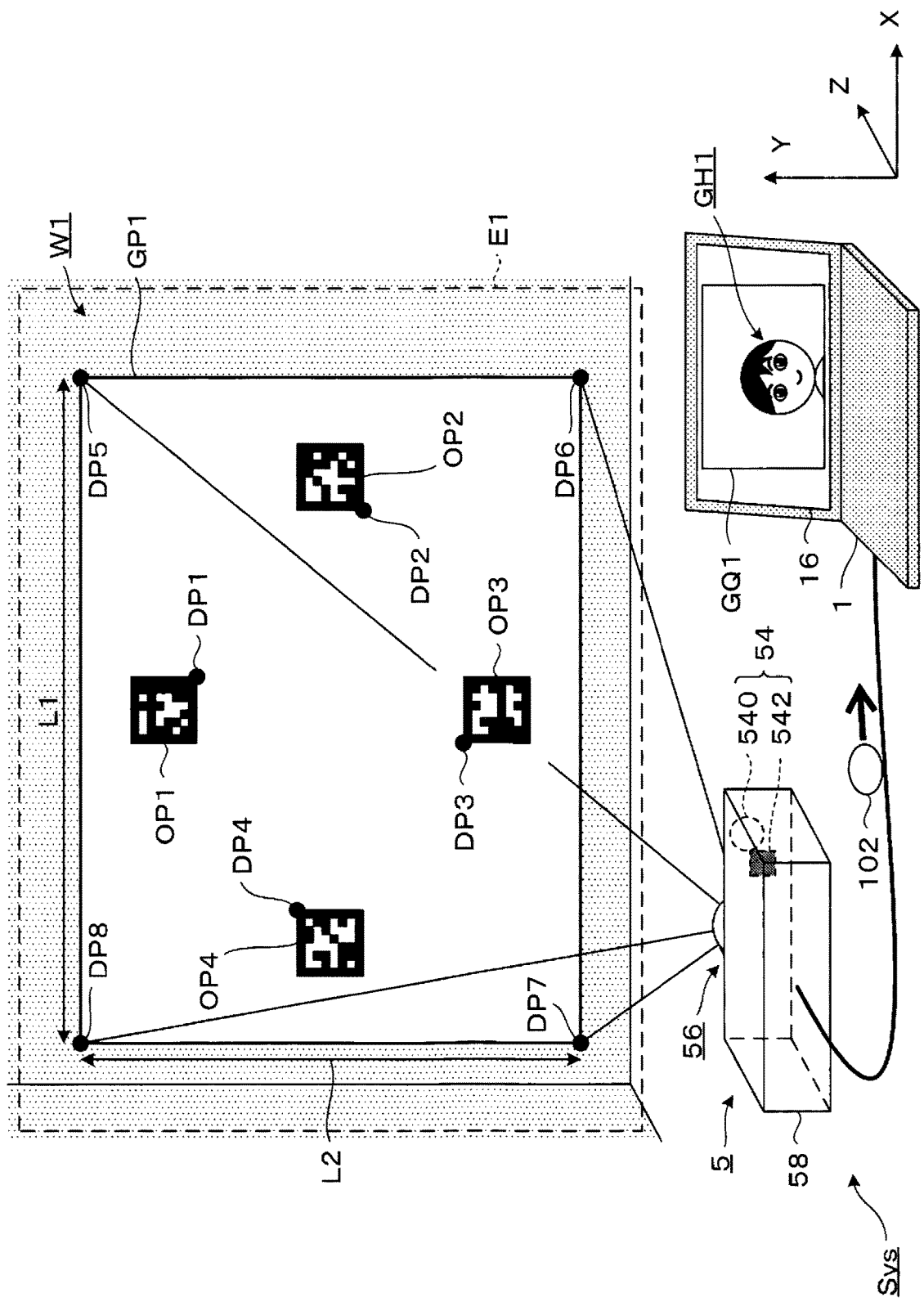
FIG. 1 is a schematic diagram illustrating a state in which a projection image GP1 is displayed.

A preferred embodiment related to the present disclosure will hereinafter be described with reference to the accompanying drawings. It should be noted that in the drawings, dimensions and scale sizes of each part are different from the reality in some cases, and some portions are shown schematically in order to make understanding easy. Further, the scope or the spirit of the present disclosure is not limited to the embodiment unless there is a particular description of limiting the present disclosure in the following explanation.

1. FIRST EMBODIMENT

In a first embodiment, there are described a projection method and a projection system according to the present disclosure illustrating a projection system which adjusts the size of a human image based on dimensions of a projection image to be displayed on a projection surface to thereby display the human image in life size. Here, displaying the human image in life size includes displaying the human image in an approximately life size, and is not necessarily limited to displaying the human image in the same size as a life-size image.

1.1. Outline of Projection System

Figure 2:
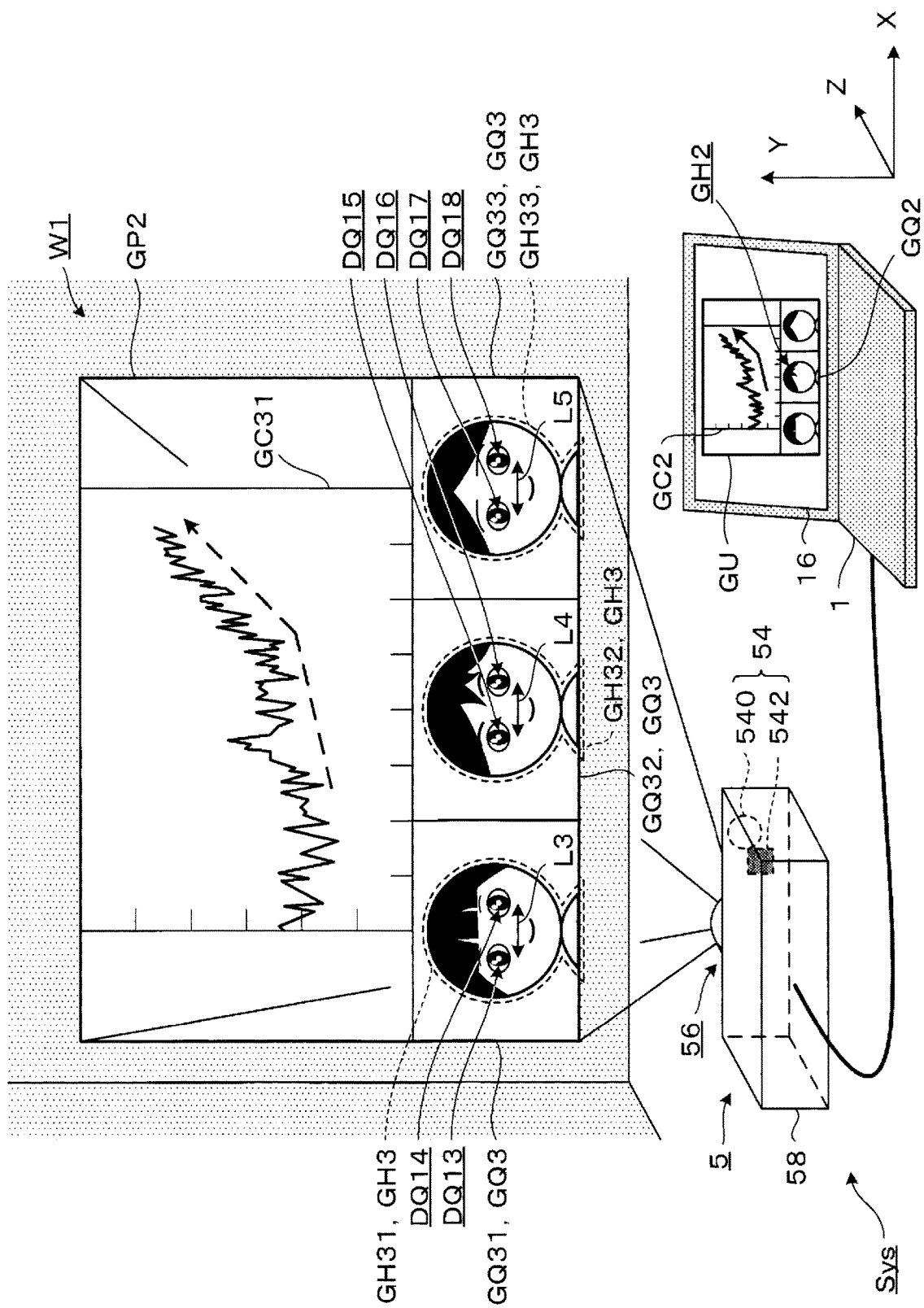
FIG. 2 is a schematic diagram illustrating a state in which a projection image GP2 is displayed.

An outline of the projection system Sys according to the first embodiment will hereinafter be described with reference to FIG. 1 and FIG. 2. FIG. 1 is a schematic diagram illustrating a state in which a projection image GP1 is displayed. FIG. 2 is a schematic diagram illustrating a state in which a projection image GP2 is displayed.

The projection system Sys is provided with a computer 1 and a projector 5. The computer 1 is coupled to the projector 5 so as to be able to communicate with each other, and performs transmission/reception of a variety of types of information. Further, the computer 1 is coupled to a terminal device not shown such as another computer and a smartphone, or an external server not shown so as to be able to communicate with each other, and performs transmission/reception of a variety of types of information. For example, in the communication between the computer 1 and the projector 5, it is possible to use HDMI coupling, wired or wireless LAN coupling, USB coupling, Bluetooth coupling, or the like. When performing the transmission/reception of data with the HDMI coupling, it is possible to make use of a protocol of DDC, CEC, or EDID. Further, the computer 1 and the projector 5 can perform the transmission/reception making use of a standard protocol and data which can define a variety of types of information, or can perform the transmission/reception making use of a protocol and data defined in a vendor-specific manner. Here, HDMI is an abbreviation for High-Definition Multimedia Interface. Further, LAN is an abbreviation for Local Area Network. Further, USB is an abbreviation for Universal Serial Bus. Further, DDC is an abbreviation for Display Data Channel. Further, CEC is an abbreviation for Consumer Electronics Control. Further, EDID is an abbreviation for Extended Display Identification Data. Further, HDMI and Bluetooth are each a registered trademark.

The computer 1 is provided with a display device 16. The display device 16 displays, for example, an image GQ1. The image GQ1 is a taken image including a human image GH1. The human image GH1 is an image representing a human imaged. The computer 1 obtains the image GQ1 from the terminal device, the external server, or the like.

The projector 5 is provided with a chassis 58. The chassis 58 is provided with a projection mechanism 56 for projecting projection light to thereby display an image on a projection surface, and a camera 54 for taking the image displayed on the projection surface by the projection mechanism 56. The camera 54 is provided with an imaging lens 540 and an imaging element 542.

It should be noted that the images displayed on the projection surface with the projection light projected from the projector 5 are hereinafter referred to collectively as a "projection image GP."

The projector 5 makes the projection mechanism 56 project the projection light to thereby display the projection image GP1 on a wall surface W1.

The projection image GP1 includes an image object OP1, an image object OP2, an image object OP3, and an image object OP4. The image objects OP1 through OP4 are each an image having a geometric pattern. Further, the image objects OP1 through OP4 each have a plurality of vertexes.

Further, the projection image GP1 includes a dot DP1, a dot DP2, a dot DP3, a dot DP4, a dot DP5, a dot DP6, a dot DP7, and a dot DP8. The dot DP1 is located at one of the vertexes provided to the image object OP1. The dot DP2 is located at one of the vertexes provided to the image object OP2. The dot DP3 is located at one of the vertexes provided to the image object OP3. The dot DP4 is located at one of the vertexes provided to the image object OP4. The dot DP5 is located at an upper right vertex viewed from the user out of the vertexes provided to the projection image GP1. The dot DP6 is located at a lower right vertex viewed from the user out of the vertexes provided to the projection image GP1. The dot DP7 is located at a lower left vertex viewed from the user out of the vertexes provided to the projection image GP1. The dot DP8 is located at an upper left vertex viewed from the user out of the vertexes provided to the projection image GP1.

In FIG. 1 and FIG. 2, an axis parallel to a vertical direction is referred to as a Y axis. Out of directions parallel to the Y axis, a vertical direction is defined as a −Y direction, and a direction opposite to the −Y direction is defined as a Y direction. Further, an axis which is perpendicular to the Y axis, and which is parallel to an optical axis of the projection mechanism 56, is referred to as a Z axis. Out of directions parallel to the Z axis, a direction from the projector 5 toward the wall surface W1 is defined as a Z direction, and a direction opposite to the Z direction is defined as a −Z direction. Further, an axis perpendicular to the Y axis and the Z axis is referred to as an X axis. Out of directions parallel to the X axis, a direction from the image object OP4 toward the image object OP2 is defined as an X direction, and a direction opposite to the X direction is defined as a −X direction. An origin of an XYZ coordinate system coincides with an optical center of the projection mechanism 56. In other words, the XYZ coordinate system is a coordinate system representing positional relationships between dots with reference to the optical center of the projection mechanism 56. Further, the coordinate of a dot in the XYZ coordinate system is expressed as (x, y, z). Here, the value x represents the X coordinate of the dot in the XYZ coordinate system. Further, the value y represents the Y coordinate of the dot in the XYZ coordinate system. Further, the value z represents the Z coordinate of the dot in the XYZ coordinate system.

The camera 54 takes an image of an imaging area E1 including the projection image GP1 to thereby obtain a taken image. Further, the camera 54 outputs a taken image information 102 representing the taken image thus obtained to the computer 1. The computer 1 calculates a dimension of the projection image GP1 displayed on the wall surface W1 such as a distance L1 between the dot DP5 and the dot DP8, based on the taken image information 102 obtained from the camera 54. It should be noted that it is possible to calculate a distance L2 between the dot DP7 and the dot DP8 as a dimension of the projection image GP1. Further, as the dimension of the projection image GP1, it is possible to calculate a length of a diagonal line of the projection image GP1. The distance L1 and the distance L2 are each represented in, for example, mm (millimeters).

The computer 1 generates an image GU shown in FIG. 2 based on the dimension of the projection image GP1 thus calculated and the image GQ1. The image GU includes an image GQ2 and a content image GC2. The image GQ2 includes a human image GH2. The human image GH2 is an image obtained by expanding or contracting the human image GH1 based on the dimension of the projection image GP1. The content image GC2 is an image showing a content to be disclosed to the user. Further, the computer 1 outputs the image GU thus generated to the projector 5. The projector 5 makes the projection mechanism 56 project the image GU to thereby display the projection image GP2 on the wall surface W1.

The projection image GP2 includes an image GQ3 and a content image GC3. The image GQ3 is an image corresponding to the image GQ2, and is an image to be displayed on the projection surface. The image GQ3 includes a human image GH3. The human image GH3 is an image corresponding to the human image GH2, and is an image to be displayed on the projection surface. In other words, the human image GH3 is an image corresponding to the human image GH1. The content image GC3 is an image corresponding to the content image GC2, and is an image to be displayed on the projection surface. In the present embodiment, the projection image GP2 includes an image GQ31, an image GQ32, and an image GQ33 as the image GQ3. The image GQ31 includes a human image GH31 as the human image GH3. The image GQ32 includes a human image GH32 as the human image GH3. The image GQ33 includes a human image GH33 as the human image GH3. Further, the projection image GP2 includes a content image GC 31 as the content image GC3. It should be noted that the dimensions of the projection image GP2 coincide with those of the projection image GP1.

The human image GH31 includes a dot DQ13 and a dot DQ14. The dot DQ13 is located at a right eye of the human image GH31. More specifically, the dot DQ13 is located at a pupil of the right eye of the human image GH31. The dot DQ14 is located at a left eye of the human image GH31. More specifically, the dot DQ14 is located at a pupil of the left eye of the human image GH31.

The human image GH32 includes a dot DQ15 and a dot DQ16. The dot DQ15 is located at a right eye of the human image GH32. More specifically, the dot DQ15 is located at a pupil of the right eye of the human image GH32. The dot DQ16 is located at a left eye of the human image GH32. More specifically, the dot DQ16 is located at a pupil of the left eye of the human image GH32.

The human image GH33 includes a dot DQ17 and a dot DQ18. The dot DQ17 is located at a right eye of the human image GH33. More specifically, the dot DQ17 is located at a pupil of the right eye of the human image GH33. The dot DQ18 is located at a left eye of the human image GH33. More specifically, the dot DQ18 is located at a pupil of the left eye of the human image GH33.

In the projection image GP2, a distance L3 between the dot DQ13 and the dot DQ14, a distance L4 between the dot DQ15 and the dot DQ16, and a distance L5 between the dot DQ17 and the dot DQ18 become to have predetermined values. Specifically, it is preferable for the distance L3, the distance L4, and the distance L5 to become about 63 mm. It is known that a distance between both pupils of a human is small in difference between individuals, and an average value of the distance is about 63 mm. Therefore, when the distance L3, the distance L4, and the distance L5 in the projection image GP2 become about 63 mm by the size of the human image GH2 in the image GU being appropriately set, the human image GH31, the human image GH32, and the human image GH33 are displayed in life size. In the present embodiment, there is assumed when the distance L3, the distance L4, and the distance L5 are each about 63 mm. It should be noted that the distance L3, the distance L4, and the distance L5 can be no smaller than 57 mm and no larger than 69 mm.

It is possible for the user to obtain feeling of presence as if a person represented by the human image GH31, a person represented by the human image GH32, and a person represented by the human image GH33 were there by checking the human image GH31, the human image GH32, and the human image GH33 displayed in life size. Further, since the size of the human image GH2 is set based on the dimensions of the projection image GP, it is possible for the user to omit an adjustment operation for displaying the human image GH31, the human image GH32, and the human image GH33 in a desired size.

1.2. Configuration and Functions of Projection System

A configuration and functions of the projection system Sys according to the first embodiment will hereinafter be described with reference to FIG. 3 through FIG. 14.

Figure 3:
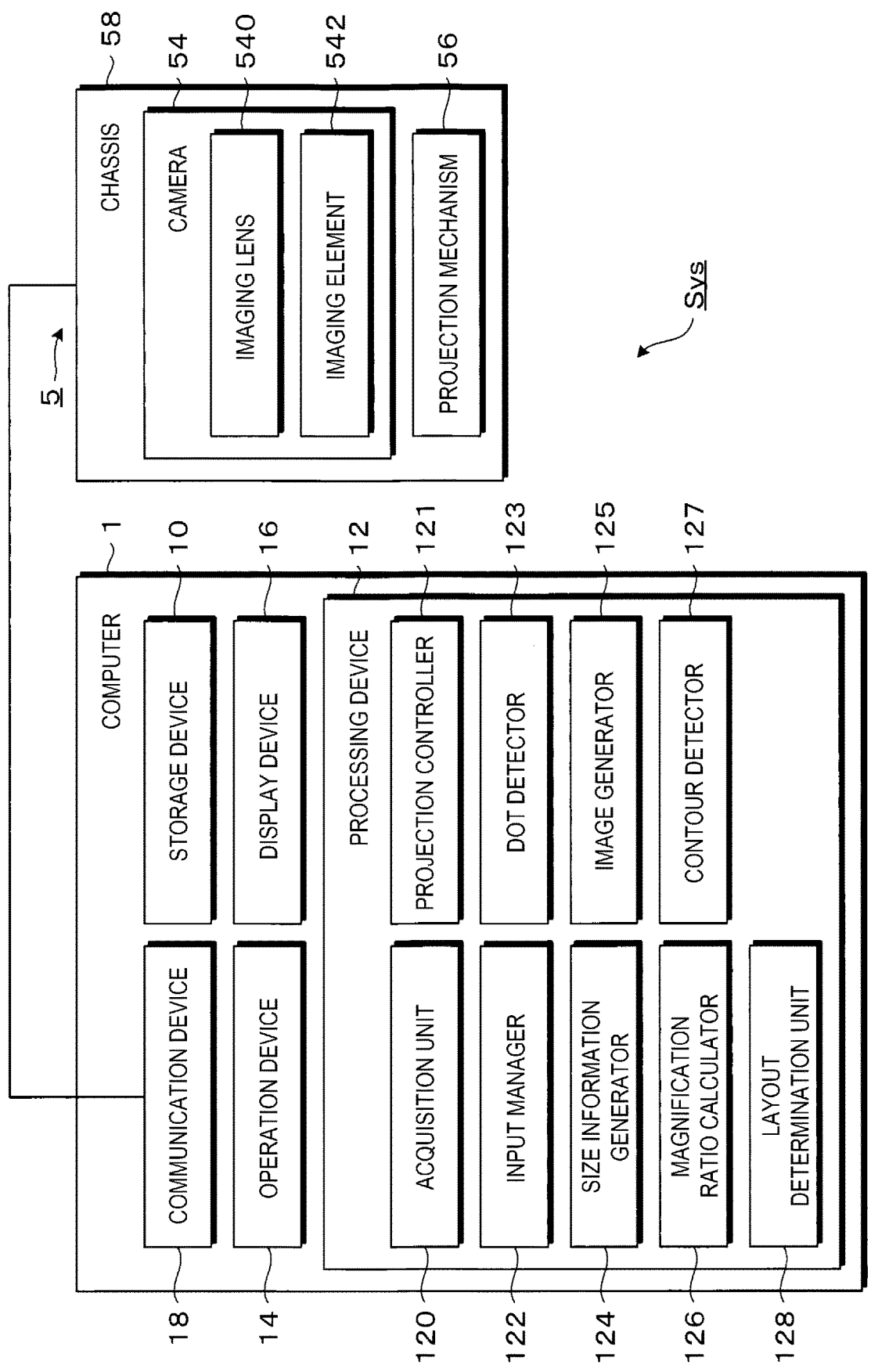
FIG. 3 is a block diagram showing a configuration of a projection system Sys according to a first embodiment.

FIG. 3 is a block diagram showing a configuration of a projection system Sys according to the first embodiment. As described above, the projection system Sys is provided with a computer 1 and a projector 5.

The computer 1 is provided with a storage device 10 for storing a variety of types of information, a processing device 12 for controlling an operation of the computer 1, an operation device 14 for receiving an input operation from the user, a display device 16 for displaying the variety of types of information, and a communication device 18 for executing communication with the projector 5, the external storage device, the external server, and so on. The processing device 12 has functions as an acquisition unit 120, a projection controller 121, an input manager 122, a dot detector 123, a size information generator 124, an image generator 125, a magnification ratio calculator 126, a contour detector 127, and a layout determination unit 128.

The projector 5 projects the projection light corresponding to an image output from the computer 1 to thereby display the projection image GP on the projection surface. The projector 5 is provided with a camera 54 for taking the projection image GP displayed on the projection surface, a projection mechanism 56 for projecting the projection light to thereby display the projection image GP on the projection surface, and a chassis 58 for housing a variety of components constituting the projector 5.

The storage device 10 is configured including, for example, a volatile memory such as a RAM and a nonvolatile memory such as a ROM. Here, RAM is an abbreviation for Random Access Memory. Further, ROM is an abbreviation for Read Only Memory.

Figure 4:
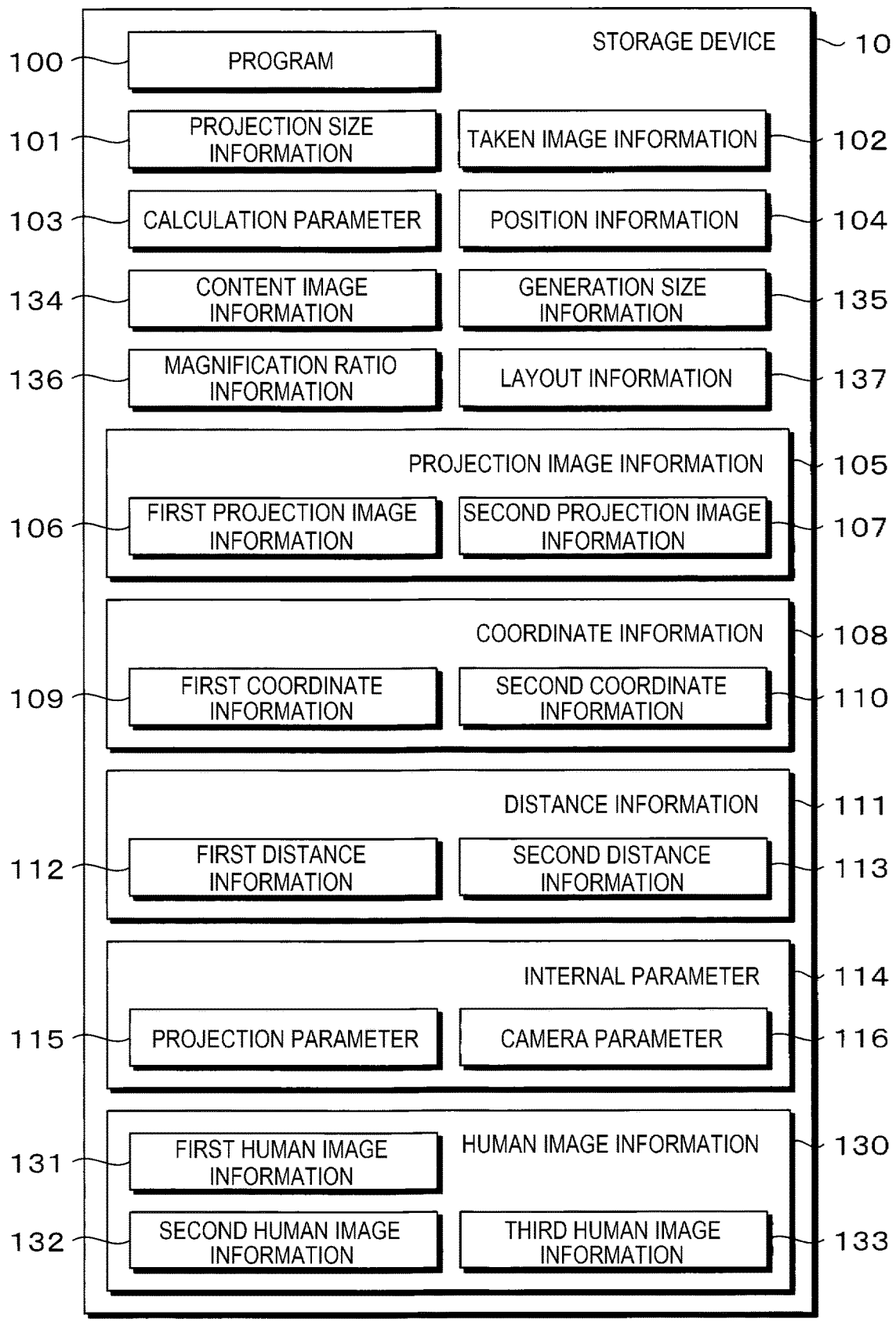
FIG. 4 is a block diagram showing a configuration of a storage device 10 related to the first embodiment.

FIG. 4 is a block diagram showing a configuration of the storage device 10 related to the first embodiment. The nonvolatile memory provided to the storage device 10 stores a program 100 for defining operations of the computer 1, projection size information 101 representing the dimensions of the projection image GP displayed on the projection surface, taken image information 102 representing a result obtained by taking the projection image GP displayed on the projection surface, position information 104 representing a positional relationship between the camera 54 and the projection mechanism 56, projection image information 105 for forming the projection light to be projected when displaying the projection image GP on the projection surface, coordinate information 108 representing a coordinate of a dot included in a variety of images, distance information 111 related to a distance between specific two dots in a variety of images, an internal parameter 114 representing a variety of variables inherent in the device, a calculation parameter 103 representing a variety of variables calculated based on the position information 104, the coordinate information 108, and the internal parameter 114, human image information 130 representing the image GQ1, content image information 134 representing an image showing a content disclosed to the user, generation size information 135 for designating the dimensions of the image GU, magnification ratio information 136 representing adjustment magnification ratio for adjusting the size of the human image GH1, and layout information 137 for designating a layout of a variety of images constituting the image GU. The projection image information 105 includes first projection image information 106 and second projection image information 107. The coordinate information 108 includes first coordinate information 109 and second coordinate information 110. The distance information 111 includes first distance information 112 representing a distance between specific two dots included in the human image GH1. Further, the distance information 111 includes second distance information 113 which is information for designating a distance between two dots included in the human image GH3, and which designates a distance between two dots corresponding to the specific two dots included in the human image GH1. The internal parameter 114 includes a projection parameter 115 representing a variable which derives from the projection mechanism 56, and a camera parameter 116 representing a variable which derives from the camera 54. The human image information 130 includes first human image information 131, second human image information 132, and third human image information 133.

The position information 104 is information representing, for example, a position vector T' representing the position of the camera 54 to the projection mechanism 56. The size of the vector T' coincides with a distance between the optical center of the camera 54 and the optical center of the projection mechanism 56.

In the present embodiment, the second distance information 113 designates a distance between a dot located at the right eye of the human image GH3 and a dot located at the left eye of the human image GH3. In other words, the second distance information 113 designates the values of the distance L3, the distance L4, and the distance L5. Specifically, the second distance information 113 designates the values of the distance L3, the distance L4, and the distance L5 into 63 mm.

Further, the volatile memory provided to the storage device 10 is used by the processing device 12 as a work area when executing the program 100.

It should be noted that a part or the whole of the storage device 10 can be provided to an external storage device, an external server, or the like. Further, a part or the whole of the variety of types of information stored in the storage device 10 can be one stored in advance in the storage device 10, or can also be one obtained from the external storage device, the external server, or the like. In the present embodiment, the position information 104 is stored in advance in the storage device 10.

Figure 5:
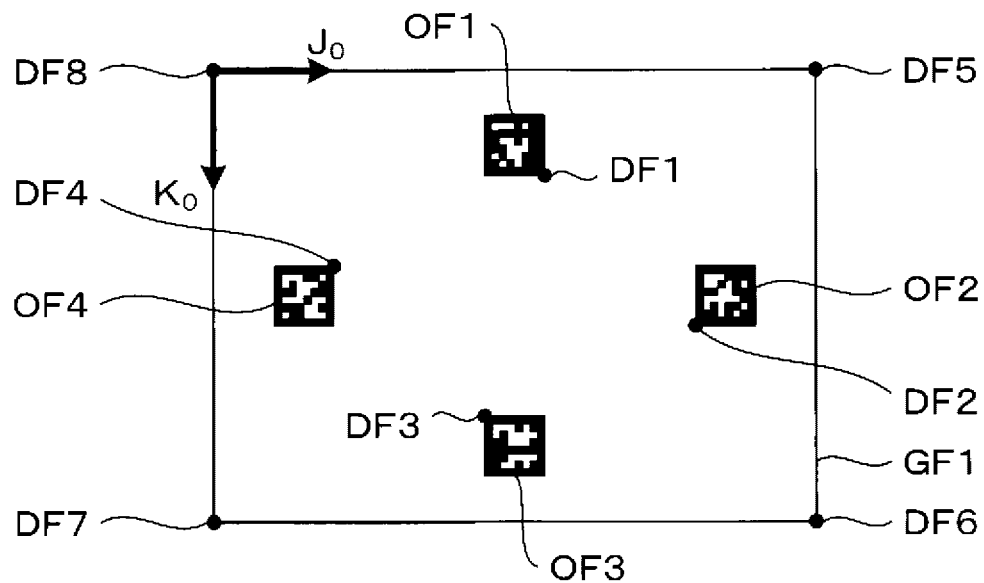
FIG. 5 is a schematic diagram illustrating an example of an image represented by first projection image information 106.

FIG. 5 is a schematic diagram illustrating an example of an image represented by the first projection image information 106. In the present embodiment, the first projection image information 106 represents an image GF1. The projector 5 makes the projection mechanism 56 project the projection light based on the first projection image information 106 to thereby display the projection image GP1 on the wall surface W1. In other words, the projector 5 makes the projection mechanism 56 project the image GF1 to thereby display the projection image GP1 on the wall surface W1. In other words, the image GF1 is an image corresponding to the projection image GP1.

The image GF1 includes an image object OF1, an image object OF2, an image object OF3, and an image object OF4. The image object OF1 corresponds to the image object OP1. The image object OF2 corresponds to the image object OP2. The image object OF3 corresponds to the image object OP3. The image object OF4 corresponds to the image object OP4. The image objects OF1 through OF4 are each an image having a geometric pattern obtained by combining a plurality of rectangles with each other. In other words, the image objects OF1 through OF4 each have a plurality of vertexes.

Further, the image GF1 includes a dot DF1, a dot DF2, a dot DF3, a dot DF4, a dot DF5, a dot DF6, a dot DF7, and a dot DF8. The dot DF1 is a dot corresponding to the dot DP1. The dot DF1 is located at one of the vertexes provided to the image object OF1. The dot DF2 is a dot corresponding to the dot DP2. The dot DF2 is located at one of the vertexes provided to the image object OF2. The dot DF3 is a dot corresponding to the dot DP3. The dot DF3 is located at one of the vertexes provided to the image object OF3. The dot DF4 is a dot corresponding to the dot DP4. The dot DF4 is located at one of the vertexes provided to the image object OF4. The dot DF5 is a dot corresponding to the dot DP5. The dot DF5 is located at an upper right vertex out of a plurality of vertexes provided to the image GF1. The dot DF6 is a dot corresponding to the dot DP6. The dot DF6 is located at a lower right vertex out of the plurality of vertexes provided to the image GF1. The dot DF7 is a dot corresponding to the dot DP7. The dot DF7 is located at a lower left vertex out of the plurality of vertexes provided to the image GF1. The dot DF8 is a dot corresponding to the dot DP8. The dot DF8 is located at an upper left vertex out of the plurality of vertexes provided to the image GF1.

In the image GF1, an upper left vertex of the image is defined as the origin. Further, a direction which is parallel to the longitudinal direction of the image GF1, and rightward from the origin when facing to the image is defined as a $J_0$ direction, and a direction which is parallel to a short-side direction of the image GF1, and downward from the origin when facing to the image is defined as a $K_0$ direction. Further, an axis extending from the origin toward the $J_0$ direction is defined as a $J_0$ axis, and an axis extending from the origin toward the $K_0$ direction is defined as a $K_0$ axis. Further, the coordinate of a dot in the image GF1 is expressed as $(j_0,k_0)$. Here, the value $j_0$ represents a $J_0$ coordinate of the dot in the image GF1. Further, the value $k_0$ represents a $K_0$ coordinate of the dot in the image GF1.

Figure 6:
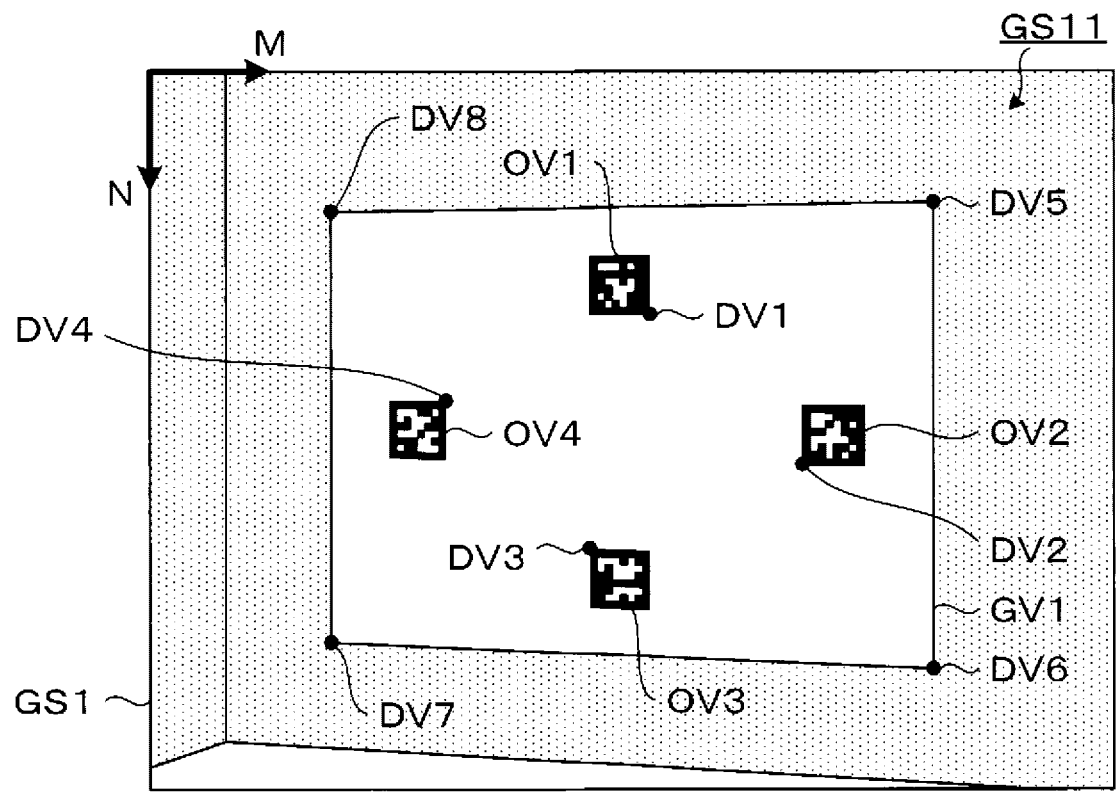
FIG. 6 is a schematic diagram illustrating an example of an image represented by taken image information 102.

FIG. 6 is a schematic diagram illustrating an example of an image represented by the taken image information 102. In the present embodiment, the taken image information 102 represents a result obtained by taking the projection image GP1 displayed on the wall surface W1. Further, the taken image information 102 represents a taken image GS1. The taken image GS1 includes an image GS11. The image GS11 is an image showing the wall surface W1. The image GS11 includes an image GV1. The image GV1 is an image showing the projection image GP1.

The image GV1 includes an image object OV1, an image object OV2, an image object OV3, and an image object OV4. The image object OV1 corresponds to the image object OP1. In other words, the image object OV1 corresponds to the image object OF1. The image object OV2 corresponds to the image object OP2. In other words, the image object OV2 corresponds to the image object OF2. The image object OV3 corresponds to the image object OP3. In other words, the image object OV3 corresponds to the image object OF3. The image object OV4 corresponds to the image object OP4. In other words, the image object OV4 corresponds to the image object OF4. The image objects OV1 through OV4 are each an image having a geometric pattern. Further, the image objects OV1 through OV4 each have a plurality of vertexes.

Further, the image GV1 includes a dot DV1, a dot DV2, a dot DV3, a dot DV4, a dot DV5, a dot DV6, a dot DV7, and a dot DV8. The dot DV1 is a dot corresponding to the dot DP1. In other words, the dot DV1 is a dot corresponding to the dot DF1. The dot DV1 is located at one of the vertexes provided to the image object OV1. The dot DV2 is a dot corresponding to the dot DP2. In other words, the dot DV2 is a dot corresponding to the dot DF2. The dot DV2 is located at one of the vertexes provided to the image object OV2. The dot DV3 is a dot corresponding to the dot DP3. In other words, the dot DV3 is a dot corresponding to the dot DF3. The dot DV3 is located at one of the vertexes provided to the image object OV3. The dot DV4 is a dot corresponding to the dot DP4. In other words, the dot DV4 is a dot corresponding to the dot DF4. The dot DV4 is located at one of the vertexes provided to the image object OV4. Therefore, the dots DV1 through DV4 correspond one-to-one to the dots DF1 through DF4.

The dot DV5 is a dot corresponding to the dot DP5. In other words, the dot DV5 is a dot corresponding to the dot DF5. The dot DV5 is located at an upper right vertex out of a plurality of vertexes provided to the image GV1. The dot DV6 is a dot corresponding to the dot DP6. In other words, the dot DV6 is a dot corresponding to the dot DF6. The dot DV6 is located at a lower right vertex out of the plurality of vertexes provided to the image GV1. The dot DV7 is a dot corresponding to the dot DP7. In other words, the dot DV7 is a dot corresponding to the dot DF7. The dot DV7 is located at a lower left vertex out of the plurality of vertexes provided to the image GV1. The dot DV8 is a dot corresponding to the dot DP8. In other words, the dot DV8 is a dot corresponding to the dot DF8. The dot DV8 is located at an upper left vertex out of the plurality of vertexes provided to the image GV1. Therefore, the dots DV5 through DV8 correspond one-to-one to the dots DF5 through DF8.

In the taken image GS1, an upper left vertex of the image is defined as the origin. Further, a direction which is parallel to the longitudinal direction of the taken image GS1, and rightward from the origin when facing to the image is defined as an M direction, and a direction which is parallel to a short-side direction of the taken image GS1, and downward from the origin when facing to the image is defined as an N direction. Further, an axis extending from the origin toward the M direction is defined as an M axis, and an axis extending from the origin toward the N direction is defined as an N axis. Further, the coordinate of a dot in the taken image GS1 is expressed as (m,n). Here, the value m represents an M coordinate of the dot in the taken image GS1. Further, the value n represents an N coordinate of the dot in the taken image GS1.

Figure 7:
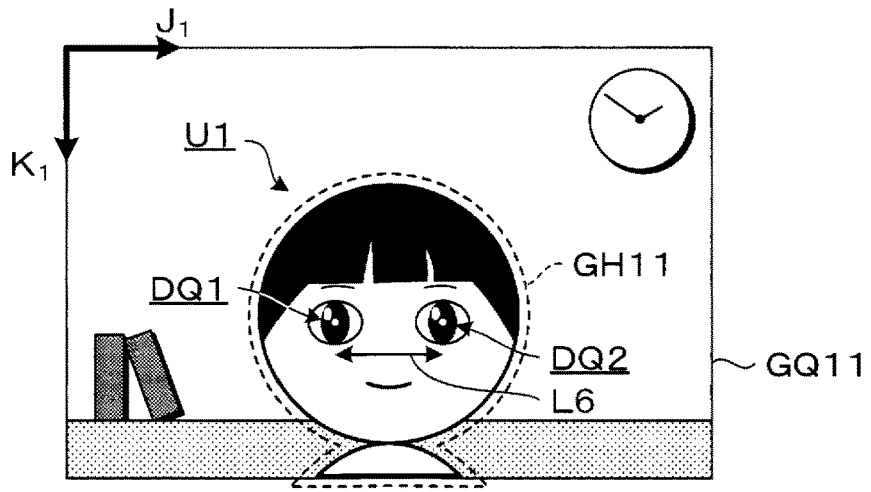
FIG. 7 is a schematic diagram illustrating an example of an image represented by first human image information 131.

FIG. 7 is a schematic diagram illustrating an example of an image represented by the first human image information 131. In the present embodiment, the first human image information 131 represents an image GQ11. The image GQ11 is an example of the image GQ1. The image GQ11 is a taken image including a human image GH11. The human image GH11 is an image representing a person U1. In other words, the image GQ11 is an image showing a result obtained by imaging the person U1.

The human image GH11 is an image corresponding to the human image GH31. In other words, the human image GH31 is an image representing the person U1. Further, the human image GH11 includes a dot DQ1 and a dot DQ2. The dot DQ1 is a dot corresponding to the dot DQ13. The dot DQ1 is located at a right eye of the human image GH11. More specifically, the dot DQ1 is located at a pupil of the right eye of the human image GH11. The dot DQ2 is a dot corresponding to the dot DQ14. The dot DQ2 is located at a left eye of the human image GH11. More specifically, the dot DQ2 is located at a pupil of the left eye of the human image GH11. It should be noted that a distance between the dot DQ1 and the dot DQ2 is hereinafter referred to as a distance L6. The distance L6 is represented in, for example, px (pixels).

In the image GQ11, an upper left vertex of the image is defined as the origin. Further, a direction which is parallel to the longitudinal direction of the image GQ11, and rightward from the origin when facing to the image is defined as a $J_1$ direction, and a direction which is parallel to a short-side direction of the image GQ11, and downward from the origin when facing to the image is defined as a $K_1$ direction. Further, an axis extending from the origin toward the $J_1$ direction is defined as a $J_1$ axis, and an axis extending from the origin toward the $K_1$ direction is defined as a $K_1$ axis. Further, the coordinate of a dot in the image GQ11 is expressed as $(j_1,k_1)$. Here, the value $j_1$ represents a $J_1$ coordinate of the dot in the image GQ11. Further, the value $k_1$ represents a $K_1$ coordinate of the dot in the image GQ11.

Figure 8:
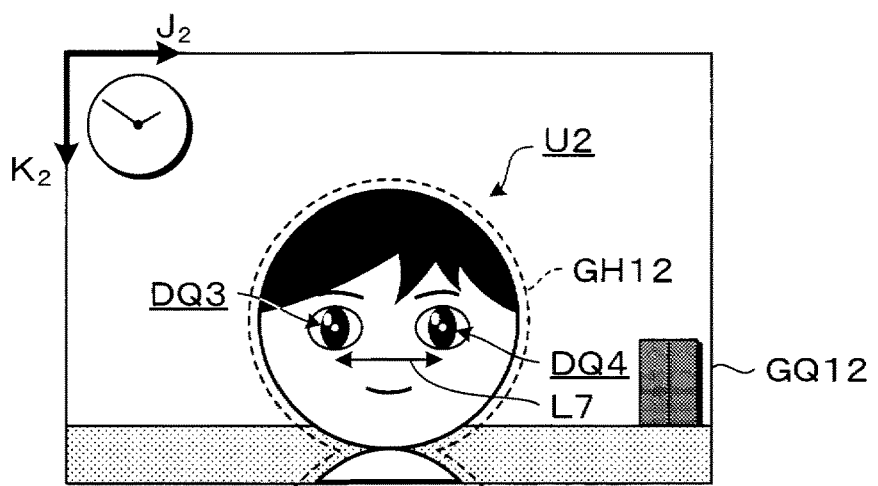
FIG. 8 is a schematic diagram illustrating an example of an image represented by second human image information 132.

FIG. 8 is a schematic diagram illustrating an example of an image represented by the second human image information 132. In the present embodiment, the second human image information 132 represents an image GQ12. The image GQ12 is an example of the image GQ1. The image GQ12 is a taken image including a human image GH12. The human image GH12 is an image representing a person U2. In other words, the image GQ12 is an image showing a result obtained by imaging the person U2.

The human image GH12 is an image corresponding to the human image GH32. In other words, the human image GH32 is an image representing the person U2. Further, the human image GH12 includes a dot DQ3 and a dot DQ4. The dot DQ3 is a dot corresponding to the dot DQ15. The dot DQ3 is located at a right eye of the human image GH12. More specifically, the dot DQ3 is located at a pupil of the right eye of the human image GH12. The dot DQ4 is a dot corresponding to the dot DQ16. The dot DQ4 is located at a left eye of the human image GH12. More specifically, the dot DQ4 is located at a pupil of the left eye of the human image GH12. It should be noted that a distance between the dot DQ3 and the dot DQ4 is hereinafter referred to as a distance L7. The distance L7 is represented in, for example, px.

In the image GQ12, an upper left vertex of the image is defined as the origin. Further, a direction which is parallel to the longitudinal direction of the image GQ12, and rightward from the origin when facing to the image is defined as a $J_2$ direction, and a direction which is parallel to a short-side direction of the image GQ12, and downward from the origin when facing to the image is defined as a $K_2$ direction. Further, an axis extending from the origin toward the $J_2$ direction is defined as a $J_2$ axis, and an axis extending from the origin toward the $K_2$ direction is defined as a $K_2$ axis. Further, the coordinate of a dot in the image GQ12 is expressed as $(j_2,k_2)$. Here, the value $j_2$ represents a $J_2$ coordinate of the dot in the image GQ12. Further, the value $k_2$ represents a $K_2$ coordinate of the dot in the image GQ12.

Figure 9:
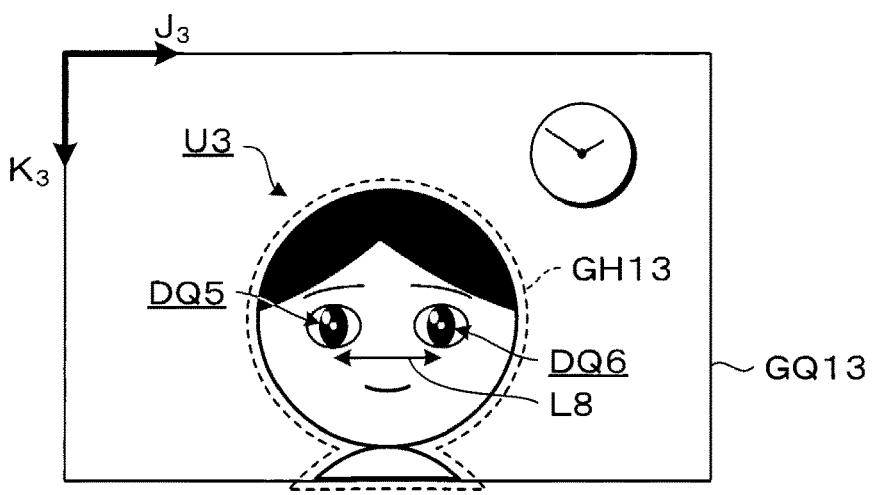
FIG. 9 is a schematic diagram illustrating an example of an image represented by third human image information 133.

FIG. 9 is a schematic diagram illustrating an example of an image represented by the third human image information 133. In the present embodiment, the third human image information 133 represents an image GQ13. The image GQ13 is an example of the image GQ1. The image GQ13 is a taken image including a human image GH13. The human image GH13 is an image representing a person U3. In other words, the image GQ13 is an image showing a result obtained by imaging the person U3.

The human image GH13 is an image corresponding to the human image GH33. In other words, the human image GH33 is an image representing the person U3. Further, the human image GH13 includes a dot DQ5 and a dot DQ6. The dot DQ5 is a dot corresponding to the dot DQ17. The dot DQ5 is located at a right eye of the human image GH13. More specifically, the dot DQ5 is located at a pupil of the right eye of the human image GH13. The dot DQ6 is a dot corresponding to the dot DQ18. The dot DQ6 is located at a left eye of the human image GH13. More specifically, the dot DQ6 is located at a pupil of the left eye of the human image GH13. It should be noted that a distance between the dot DQ5 and the dot DQ6 is hereinafter referred to as a distance L8. The distance L8 is represented in, for example, px.

In the image GQ13, an upper left vertex of the image is defined as the origin. Further, a direction which is parallel to the longitudinal direction of the image GQ13, and rightward from the origin when facing to the image is defined as a $J_3$ direction, and a direction which is parallel to a short-side direction of the image GQ13, and downward from the origin when facing to the image is defined as a $K_3$ direction. Further, an axis extending from the origin toward the $J_3$ direction is defined as a $J_3$ axis, and an axis extending from the origin toward the $K_3$ direction is defined as a $K_3$ axis. Further, the coordinate of a dot in the image GQ13 is expressed as $(j_3,k_3)$. Here, the value $j_3$ represents a $J_3$ coordinate of the dot in the image GQ13. Further, the value $k_3$ represents a $K_3$ coordinate of the dot in the image GQ13.

Going back to FIG. 3, the processing device 12 is configured including a single CPU or a plurality of CPUs. It should be noted that the processing device 12 can be a device provided with a programmable logic device such as an FPGA instead of, or in addition to the CPU. Here, CPU is an abbreviation for Central Processing Unit, and FPGA is an abbreviation for Field-Programmable Gate Array.

The processing device 12 functions as the acquisition unit 120, the projection controller 121, the input manager 122, the dot detector 123, the size information generator 124, the image generator 125, the magnification ratio calculator 126, the contour detector 127, and the layout determination unit 128 shown in FIG. 3 by the CPU and so on provided to the processing device 12 executing the program 100.

The acquisition unit 120 controls the communication device 18 to thereby obtain a variety of types of information from projector 5, the terminal device, the external storage device, the external server, and so on coupled to the computer 1 so as to communicate with each other. Further, the acquisition unit 120 makes the storage device 10 store the variety of types of information thus obtained.

In the present embodiment, the acquisition unit 120 obtains the first projection image information 106 and the first coordinate information 109 from the external server coupled to the computer 1 so as to communicate with each other. Then, the acquisition unit 120 makes the storage device 10 store the first projection image information 106 and the first coordinate information 109 thus obtained.

Further, the acquisition unit 120 obtains the taken image information 102 output from the imaging element 542 provided to the camera 54. Then, the acquisition unit 120 makes the storage device 10 store the taken image information 102 thus obtained.

Further, the acquisition unit 120 obtains the human image information 130 from the terminal device coupled to the computer 1 so as to communicate with each other. Then, the acquisition unit 120 makes the storage device 10 store the human image information 130 thus obtained. Specifically, the acquisition unit 120 obtains the first human image information 131, the second human image information 132, and the third human image information 133 from a plurality of terminal devices coupled to the computer 1 so as to communicate with each other. Then, the acquisition unit 120 makes the storage device 10 store the first human image information 131, the second human image information 132, and the third human image information 133 thus obtained. It should be noted that the first human image information 131, the second human image information 132, and the third human image information 133 are obtained respectively from the terminal devices different from each other.

The projection controller 121 controls the communication device 18 to thereby output the projection image information 105 to the projector 5. The projector 5 makes the projection mechanism 56 project the projection light based on the projection image information 105 to thereby display the projection image GP on the projection surface. In other words, the projection controller 121 makes the projection mechanism 56 project the projection light based on the projection image information 105 to thereby display the projection image GP on the projection surface. In the present embodiment, the projection controller 121 makes the projection mechanism 56 project the projection light based on the projection image information 105 to thereby display the projection image GP on the wall surface W1. Specifically, the projection controller 121 makes the projection mechanism 56 project the projection light based on the first projection image information 106 to thereby display the projection image GP1 on the wall surface W1. Further, the projection controller 121 makes the projection mechanism 56 project the projection light based on the second projection image information 107 to thereby display the projection image GP2 on the wall surface W1.

The input manager 122 controls the operation device 14 to thereby obtain the operation data representing the content of the operation received from the user. Further, the input manager 122 executes a variety of operations based on the operation data thus obtained.

The dot detector 123 executes the image processing on the image represented by the variety of types of image information to thereby detect a dot included in that image. In other words, the dot detector 123 obtains the coordinate information 108 representing the coordinate of the dot thus detected. Further, the dot detector 123 makes the storage device 10 store the coordinate information 108 thus obtained.

In the present embodiment, the dot detector 123 executes the image processing on the image represented by the taken image information 102 to thereby detect a plurality of dots included in the image represented by the taken image information 102. In other words, the dot detector 123 obtains the second coordinate information 110 representing the coordinates of the plurality of dots included in the image represented by the taken image information 102. Further, the dot detector 123 makes the storage device 10 store the second coordinate information 110 thus obtained. Specifically, the dot detector 123 executes the image processing on the taken image GS1 to thereby detect a plurality of dots including the dots DV1 through DV4 as the plurality of dots included in the taken image GS1. The second coordinate information 110 represents the coordinates of the plurality of dots included in the taken image GS1. In other words, the second coordinate information 110 represents the coordinates of the plurality of dots including the dots DV1 through DV4.

It is possible for the dot detector 123 to execute the image processing on the image represented by the first projection image information 106 to thereby detect a plurality of dots included in the image represented by the first projection image information 106. When the dot detector 123 has detected the plurality of dots included in the image represented by the first projection image information 106, the dot detector 123 obtains the first coordinate information 109 which represents the coordinates of the plurality of dots included in the image represented by the first projection image information 106. Further, the dot detector 123 makes the storage device 10 store the first coordinate information 109 thus obtained. Specifically, the first coordinate information 109 represents the coordinates of the plurality of dots included in the image GF1. More specifically, the first coordinate information 109 represents the coordinates of the plurality of dots including the dots DF1 through DF4. Further, the first coordinate information 109 represents the coordinates of the dots DF5 through DF8.

Further, the dot detector 123 detects a dot located at the right eye of the human image GH1 and a dot located at the left eye of the human image GH1. Then, the dot detector 123 calculates a distance between the dot located at the right eye of the human image GH1 and the dot located at the left eye of the human image GH1. In other words, the dot detector 123 obtains the first distance information 112 representing the distance between the dot located at the right eye of the human image GH1 and the dot located at the left eye of the human image GH1.

In the present embodiment, the dot detector 123 detects a dot located at a pupil of the right eye of the human image GH1 and a dot located at a pupil of the left eye of the human image GH1. Specifically, the dot detector 123 executes the image processing on the image GQ11 to thereby detect the dot DQ1 and the dot DQ2. Then, the dot detector 123 calculates the distance L6 between the dot DQ1 and the dot DQ2. Further, the dot detector 123 executes the image processing on the image GQ12 to thereby detect the dot DQ3 and the dot DQ4. Then, the dot detector 123 calculates the distance L7 between the dot DQ3 and the dot DQ4. Further, the dot detector 123 executes the image processing on the image GQ13 to thereby detect the dot DQ5 and the dot DQ6. Then, the dot detector 123 calculates the distance L8 between the dot DQ5 and the dot DQ6. In the present embodiment, the first distance information 112 includes information representing the distance L6, information representing the distance L7, and information representing the distance L8.

In the function related to the detection of the dots, there can be used an image processing technology known to the public. As the image processing technology known to the public related to the detection of the dots, there can be cited, for example, template matching and an algorithm called "AKAZE." In the present specification, a detailed technical description related to the detection of the dots will be omitted.

The size information generator 124 generates the projection size information 101 based on information output from a sensor. In the present embodiment, the size information generator 124 generates the projection size information 101 based on the taken image information 102 output from the imaging element 542, the position information 104, and the first projection image information 106.

Specifically, the size information generator 124 generates the calculation parameter 103 based on the second coordinate information 110 representing the coordinate of the dot included in the image represented by the taken image information 102, the position information 104, the first coordinate information 109 representing the coordinate of the dot included in the image represented by the first projection image information 106, and the internal parameter 114. More specifically, the size information generator 124 generates the calculation parameter 103 based on the second coordinate information 110 representing the coordinate of the dot included in the taken image GS1, the position information 104, the first coordinate information 109 representing the coordinate of the dot included in the image GF1, and the internal parameter 114. Further, the size information generator 124 generates the projection size information 101 based on the first coordinate information 109, the calculation parameter 103, and the internal parameter 114.

The projection parameter 115 included in the internal parameter 114 includes information representing a focal distance of the projection mechanism 56. Further, the projection parameter 115 includes information representing a coordinate of a dot at which the center of the projection lens provided to the projection mechanism 56 overlaps the image GF1 in the $J_0K_0$ coordinate system, in other words, a coordinate of a dot at which the image GF1 and the optical axis of the projection lens provided to the projection mechanism 56 virtually cross each other. Further, the camera parameter 116 included in the internal parameter 114 includes information representing a focal distance of the imaging lens 540. Further, the camera parameter 116 includes information representing a coordinate of a dot at which the center of the imaging lens 540 overlaps taken image GS1 in the MN coordinate system, in other words, a coordinate of a point at which the taken image GS1 and the optical axis of the imaging lens 540 virtually cross each other.

A variety of variables represented by the calculation parameter 103 are derived from a projective transformation matrix generated based on at least four correspondence relationships between the coordinates of a plurality of dots represented by the first coordinate information 109 normalized based on the projection parameter 115, and the coordinates of a plurality of dots represented by the second coordinate information 110 normalized based on the camera parameter 116. Specifically, the calculation parameter 103 includes information representing a value a, a value b, and a value c when defining an equation representing the projection surface as $ax+by+cz=1$ in the XYZ coordinate system. Further, the calculation parameter 103 includes information representing a vector T representing a relative position of the camera 54 to the projection mechanism 56 in the XYZ coordinate system. Further, the calculation parameter 103 includes information representing a rotation matrix R representing a posture of the camera 54 with respect to the projection mechanism 56. Further, the calculation parameter 103 includes information representing a value s representing a ratio between a magnitude of the vector T' represented by the position information 104 and a magnitude of the vector T.

When the value a, the value b, and the value c represented by the calculation parameter 103 are figured out, a coordinate of a dot included in the projection image GP1 in the XYZ coordinate system is calculated from a correspondence relationship between a dot included in the image represented by the first projection image information 106 and a dot included in the projection image GP1. Further, a distance between two dots included in the projection image GP1 is calculated based on the coordinates of two dots different from each other and included in the projection image GP1 in the XYZ coordinate system and the value s. In the present embodiment, the coordinate of the dot DP5 and the coordinate of the dot DP8 are calculated based on the coordinate of the dot DF5 and the coordinate of the dot DF8 represented by the first coordinate information 109 normalized based on the projection parameter 115, and the value a, the value b, and the value c represented by the calculation parameter 103. Further, the distance L1 between the dot DP5 and the dot DP8 is calculated based on the coordinate of the dot DP5 and the coordinate of the dot DP8, and the value s represented by the calculation parameter 103. In other words, the projection size information 101 representing the dimensions of the projection image GP is generated based on the first coordinate information 109, the calculation parameter 103, and the internal parameter 114.

The magnification ratio calculator 126 calculates an adjustment magnification ratio for adjusting the size of the human image GH1 based on the first distance information 112, the second distance information 113, the projection size information 101, and the generation size information 135. In other words, the magnification ratio calculator 126 generates the magnification ratio information 136 representing the adjustment magnification ratio for adjusting the size of the human image GH1 based on the first distance information 112, the second distance information 113, the projection size information 101, and the generation size information 135. When defining a value of the adjustment magnification ratio represented by the magnification information 136 as a value g, a dimension of the projection image GP represented by the projection size information 101 as a value d, a value of the distance designated by the second distance information 113 as a value e, a dimension of the image GU designated by the generation size information 135 as a value f, and a value of a distance represented by the first distance information 112 as a value h, a value g representing the adjustment magnification ratio is derived from the following formula.

$g=(e \times f)/(d \times h)$

The contour detector 127 executes the image processing on the image GQ1 to thereby detect the contour of the human image GH1 from the image GQ1. In the present embodiment, the contour detector 127 executes the image processing on the image GQ11 to thereby detect the contour of the human image GH11 from the image GQ11. Further, the contour detector 127 executes the image processing on the image GQ12 to thereby detect the contour of the human image GH12 from the image GQ12. Further, the contour detector 127 executes the image processing on the image GQ13 to thereby detect the contour of the human image GH13 from the image GQ13. It should be noted that in the function related to the detection of the contour of the human image GH1, there can be used an image processing technology known to the public.

The layout determination unit 128 determines the layout of the image GU based on the generation size information 135, the magnification ratio information 136, the number of images constituting the image GU, and a type of the images constituting the image GU. In other words, the layout determination unit 128 generates the layout information 137 for designating the layout of the image GU based on the generation size information 135, the magnification ratio information 136, the number of images constituting the image GU, and a type of the images constituting the image GU.

The image generator 125 trims the image GQ1 based on the contour of the human image GH1 thus detected. Specifically, the image generator 125 generates a trimming image GT including the human image GH1 based on the contour of the human image GH1 thus detected.

Figure 10:
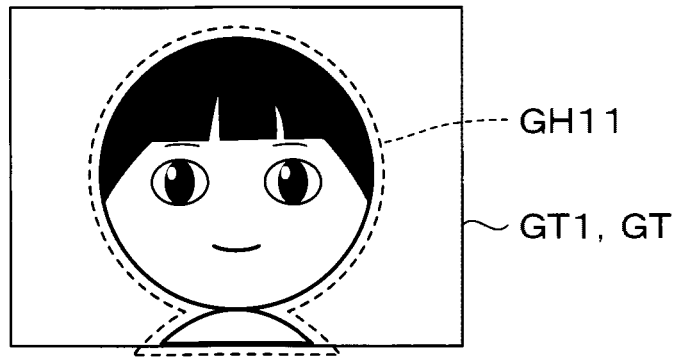
FIG. 10 is a schematic diagram illustrating an example of a trimming image GT generated from the image represented by the first human image information 131.

FIG. 10 is a schematic diagram illustrating an example of the trimming image GT generated from the image represented by the first human image information 131. In the present embodiment, the image generator 125 trims the image GQ11 based on the contour of the human image GH11 to thereby generate a trimming image GT1. The trimming image GT1 is an example of the trimming image GT. The trimming image GT1 includes a human image GH11.

Figure 11:
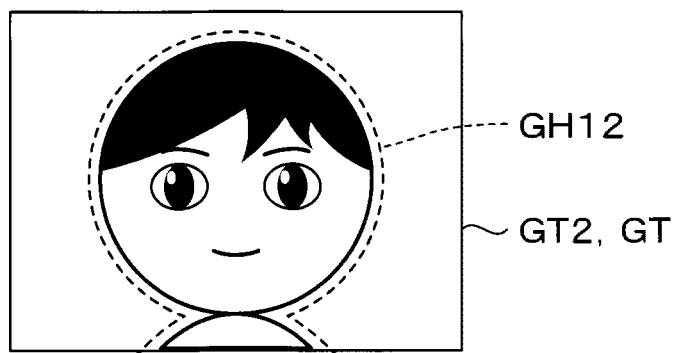
FIG. 11 is a schematic diagram illustrating an example of a trimming image GT generated from the image represented by the second human image information 132.

FIG. 11 is a schematic diagram illustrating an example of the trimming image GT generated from the image represented by the second human image information 132. In the present embodiment, the image generator 125 trims the image GQ12 based on the contour of the human image GH12 to thereby generate a trimming image GT2. The trimming image GT2 is an example of the trimming image GT. The trimming image GT2 includes the human image GH12.

Figure 12:
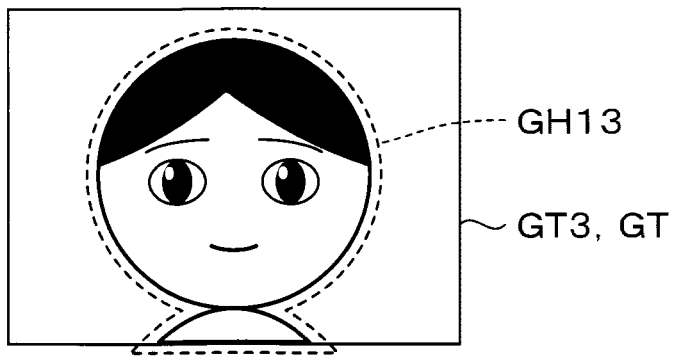
FIG. 12 is a schematic diagram illustrating an example of a trimming image GT generated from the image represented by the third human image information 133.

FIG. 12 is a schematic diagram illustrating an example of the trimming image GT generated from the image represented by the third human image information 133. In the present embodiment, the image generator 125 trims the image GQ13 based on the contour of the human image GH13 to thereby generate a trimming image GT3. The trimming image GT3 is an example of the trimming image GT. The trimming image GT3 includes the human image GH13.

Further, the image generator 125 generates the image GU based on an image including the human image GH1, the image represented by the content image information 134, the magnification ratio information 136, and the layout information 137.

Figure 13:
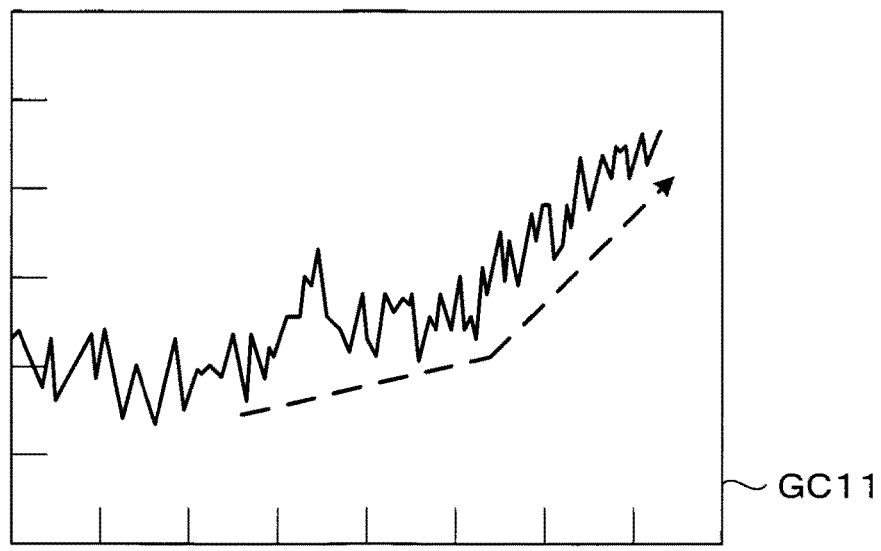
FIG. 13 is a schematic diagram illustrating an example of an image represented by content image information 134.

FIG. 13 is a schematic diagram illustrating an example of the image represented by the content image information 134. In the present embodiment, the content image information 134 represents a content image GC11. The content image GC11 is an image showing a content to be disclosed to the user.

Figure 14:
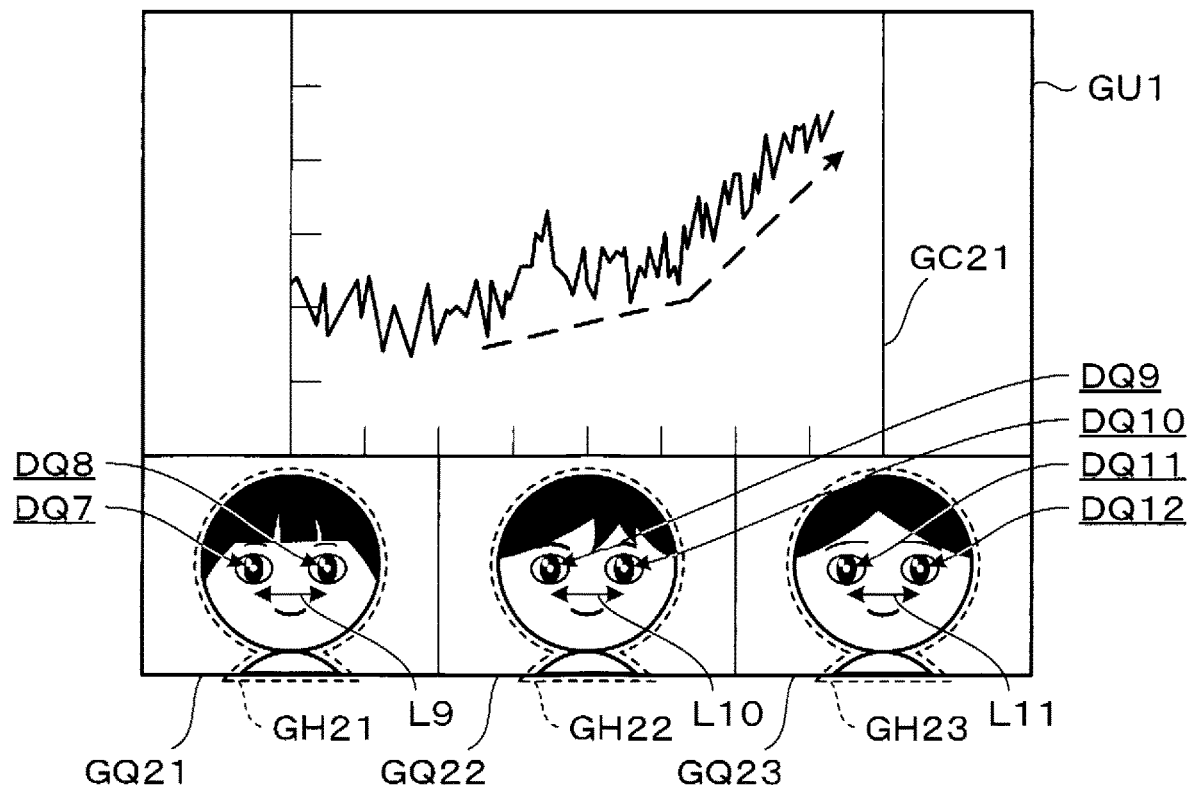
FIG. 14 is a schematic diagram illustrating an example of an image GU.

FIG. 14 is a schematic diagram illustrating an example of the image GU. In the present embodiment, the image generator 125 generates an image GU1 as the image GU. The image GU1 includes an image GQ21, an image GQ22, an image GQ23, and a content image GC21. It should be noted that the dimensions of the image GU1 coincide with dimensions designated by the generation size information 135.

Specifically, the image generator 125 generates the image GU1 based on the trimming image GT, the content image GC11, the magnification ratio information 136, and the layout information 137. In other words, the image generator 125 generates the second projection image information 107 representing the image GU1 based on the trimming image GT, the content image GC11, the magnification ratio information 136, and the layout information 137. More specifically, the image generator 125 generates the image GU1 based on the trimming image GT1, the trimming image GT2, the trimming image GT3, the content image GC11, the magnification ratio information 136, and the layout information 137. The projector 5 makes the projection mechanism 56 project the projection light based on the second projection image information 107 to thereby display the projection image GP2 on the wall surface W1. In other words, the projector 5 makes the projection mechanism 56 project the image GU1 to thereby display the projection image GP2 on the wall surface W1. In other words, the image GU1 is an image corresponding to the projection image GP2.

There is shown an example in which the image generator 125 generates the image GU based on the trimming image GT as the image including the human image GH1, but this is not a limitation. It is possible for the image generator 125 to generate the image GU based on the image GQ1 on which the trimming has not been performed instead of the trimming image GT. More specifically, it is possible for the image generator 125 to generate the image GU based on the image GQ1, the content image GC11, the magnification ratio information 136, and the layout information 137.

The image GQ21 is an example of the image GQ2. The image GQ21 includes a human image GH21. The human image GH21 is an image corresponding to the human image GH11. Further, the human image GH21 is an image corresponding to the human image GH31. In other words, the human image GH21 is an image representing the person U1. The image generator 125 adjusts the size of the trimming image GT1 based on the adjustment magnification ratio represented by the magnification ratio information 136 to thereby generate the image GQ21. In other words, the image generator 125 adjusts the size of the human image GH11 included in the trimming image GT1 based on the adjustment magnification ratio represented by the magnification ratio information 136 to thereby generate the image GQ21.

The image GQ22 is an example of the image GQ2. The image GQ22 includes a human image GH22. The human image GH22 is an image corresponding to the human image GH12. Further, the human image GH22 is an image corresponding to the human image GH32. In other words, the human image GH22 is an image representing the person U2. The image generator 125 adjusts the size of the trimming image GT2 based on the adjustment magnification ratio represented by the magnification ratio information 136 to thereby generate the image GQ22. In other words, the image generator 125 adjusts the size of the human image GH12 included in the trimming image GT2 based on the adjustment magnification ratio represented by the magnification ratio information 136 to thereby generate the image GQ22.

The image GQ23 is an example of the image GQ2. The image GQ23 includes a human image GH23. The human image GH23 is an image corresponding to the human image GH13. Further, the human image GH23 is an image corresponding to the human image GH33. In other words, the human image GH23 is an image representing the person U3. The image generator 125 adjusts the size of the trimming image GT3 based on the adjustment magnification ratio represented by the magnification ratio information 136 to thereby generate the image GQ23. In other words, the image generator 125 adjusts the size of the human image GH13 included in the trimming image GT3 based on the adjustment magnification ratio represented by the magnification ratio information 136 to thereby generate the image GQ23.

The content image GC21 is an example of the content image GC2. The content image GC21 is an image corresponding to the content image GC11. Further, the content image GC21 is an image corresponding to the content image GC31. In other words, the content image GC21 is an image showing a content to be disclosed to the user. The image generator 125 adjusts the size of the content image GC11 based on the layout information 137 to thereby generate the content image GC21.

The human image GH21 includes a dot DQ7 and a dot DQ8. The dot DQ7 is a dot corresponding to the dot DQ1. Further, the dot DQ7 is a dot corresponding to the dot DQ13. The dot DQ7 is located at a right eye of the human image GH21. More specifically, the dot DQ7 is located at a pupil of the right eye of the human image GH21. The dot DQ8 is a dot corresponding to the dot DQ2. Further, the dot DQ8 is a dot corresponding to the dot DQ14. The dot DQ8 is located at a left eye of the human image GH21. More specifically, the dot DQ8 is located at a pupil of the left eye of the human image GH21. It should be noted that a distance between the dot DQ7 and the dot DQ8 is hereinafter referred to as a distance L9. The distance L9 is represented in, for example, px.

The human image GH22 includes a dot DQ9 and a dot DQ10. The dot DQ9 is a dot corresponding to the dot DQ3. Further, the dot DQ9 is a dot corresponding to the dot DQ15. The dot DQ9 is located at a right eye of the human image GH22. More specifically, the dot DQ9 is located at a pupil of the right eye of the human image GH22. The dot DQ10 is a dot corresponding to the dot DQ4. Further, the dot DQ10 is a dot corresponding to the dot DQ16. The dot DQ10 is located at a left eye of the human image GH22. More specifically, the dot DQ10 is located at a pupil of the left eye of the human image GH22. It should be noted that a distance between the dot DQ9 and the dot DQ10 is hereinafter referred to as a distance L10. The distance L10 is represented in, for example, px.

The human image GH23 includes a dot DQ11 and a dot DQ12. The dot DQ11 is a dot corresponding to the dot DQ5. Further, the dot DQ11 is a dot corresponding to the dot DQ17. The dot DQ11 is located at a right eye of the human image GH23. More specifically, the dot DQ11 is located at a pupil of the right eye of the human image GH23. The dot DQ12 is a dot corresponding to the dot DQ6. Further, the dot DQ12 is a dot corresponding to the dot DQ18. The dot DQ12 is located at a left eye of the human image GH23. More specifically, the dot DQ12 is located at a pupil of the left eye of the human image GH23. It should be noted that a distance between the dot DQ11 and the dot DQ12 is hereinafter referred to as a distance L11. The distance L11 is represented in, for example, px.

In the image GU1, the distance L9, the distance L10, and the distance L11 are set to predetermined values. Specifically, the values of the distance L9, the distance L10, and the distance L11 are each obtained as $h \times g = (e \times f)/d$ from the value g of the adjustment magnification ratio represented by the magnification information 136, and the value h of the distance represented by the first distance information 112. Further, a ratio of a value of the distance L9, the distance L10, and the distance L11 to the dimension of the image GU1 is obtained as $\{(e \times f)/d\}/f = e/d$. This coincides with a ratio of the value of the distance designated by the second distance information 113 to the dimension of the projection image GP, in other words, a ratio of the value of the distance L3, the distance L4, and the distance L5 to the dimension of the projection image GP. In other words, when the sizes of the human images GH21 through GH23 in the image GU1 are appropriately set based on the adjustment magnification ratio represented by the magnification ratio information 136, the distance L3, the distance L4, and the distance L5 in the projection image GP2 displayed on the wall surface W1 by the image GU1 being projected are set to a value designated by the second distance information 113, specifically to 63 mm.

Going back to FIG. 3, the operation device 14 is an input interface for receiving an input operation to the computer 1 from the user of the computer 1. The operation device 14 is a keyboard, a pointing device, or the like provided to the computer 1. For example, when the operation device 14 is configured including the keyboard, the operation device 14 outputs data for identifying a button which is held down to the processing device 12. Thus, the content of the input operation to the computer 1 is transmitted to the processing device 12.

The display device 16 is configured including a display panel for displaying an image. The display device 16 controls a plurality of pixel circuits provided to the display device 16 under the control of the processing device 12 to thereby display the image. For example, when the display device 16 is configured including a liquid crystal panel, each of the pixels circuits is provided with a liquid crystal element, and controls the transmission of light emitted from a backlight with the liquid crystal element to thereby display the image. Further, when the display device 16 is configured including an organic EL panel, each of the pixels circuits is provided with a light emitting element, and controls the intensity of the light emitted from the light emitting element to thereby display the image. Here, EL is an abbreviation for Electro-Luminescence.

The communication device 18 includes, for example, an interface board having a connector and an interface circuit, and has a function of receiving a variety of types of information from the projector 5, the terminal device, the external storage device, the external server, and so on, and a function of transmitting a variety of types of information to the projector 5, the terminal device, the external storage device, the external server, and so on. The communication device 18 can transmit/receive a variety of types of information using wired communication, or can also transmit/receive them using wireless communication. When the wireless communication is used, the communication device 18 is configured including an antenna compatible with the wireless communication compliant with a predetermined communication standard.

The camera 54 is provided with the imaging lens 540 for converging light, and the imaging element 542 for converting the light thus converged into an electrical signal. The imaging element 542 is, for example, an image sensor such as a CCD sensor or a CMOS sensor. Here, CCD is an abbreviation for Charge Coupled Device, and CMOS is an abbreviation for Complementary Metal Oxide Semiconductor. The camera 54 takes an image of the imaging area E1 on the wall surface W1 on which the projection image GP1 is displayed. The imaging element 542 outputs the taken image information 102 representing the result obtained by imaging the imaging area E1 on the wall surface W1 on which the projection image GP1 is displayed, to the processing device 12. In the present embodiment, the camera 54 is disposed in the chassis 58.

The projection mechanism 56 is configured including a light source, a light modulator for forming the projection light in accordance with information output from the processing device 12, and a projection optical system for projecting the projection light on the projection surface. The light source includes, for example, a halogen lamp, a xenon lamp, a super-high pressure mercury lamp, an LED, or a laser source. The light modulator includes, for example, a DMD or a liquid crystal panel. The projection optical system includes a projection lens group having a plurality of lenses. Here, LED is an abbreviation for Light Emitting Diode, and DMD is an abbreviation for Digital Mirror Device. In the present embodiment, the projection mechanism 56 projects the projection light for displaying the projection image GP on the wall surface W1 in accordance with the information output from the processing device 12. Specifically, the projection mechanism 56 projects the image GF1 on the wall surface W1 to thereby display the projection image GP1. Further, the projection mechanism 56 projects the image GU1 on the wall surface W1 to thereby display the projection image GP2. Further, the projection mechanism 56 is disposed in the chassis 58.

1.3. Operation of Computer

Figure 15:
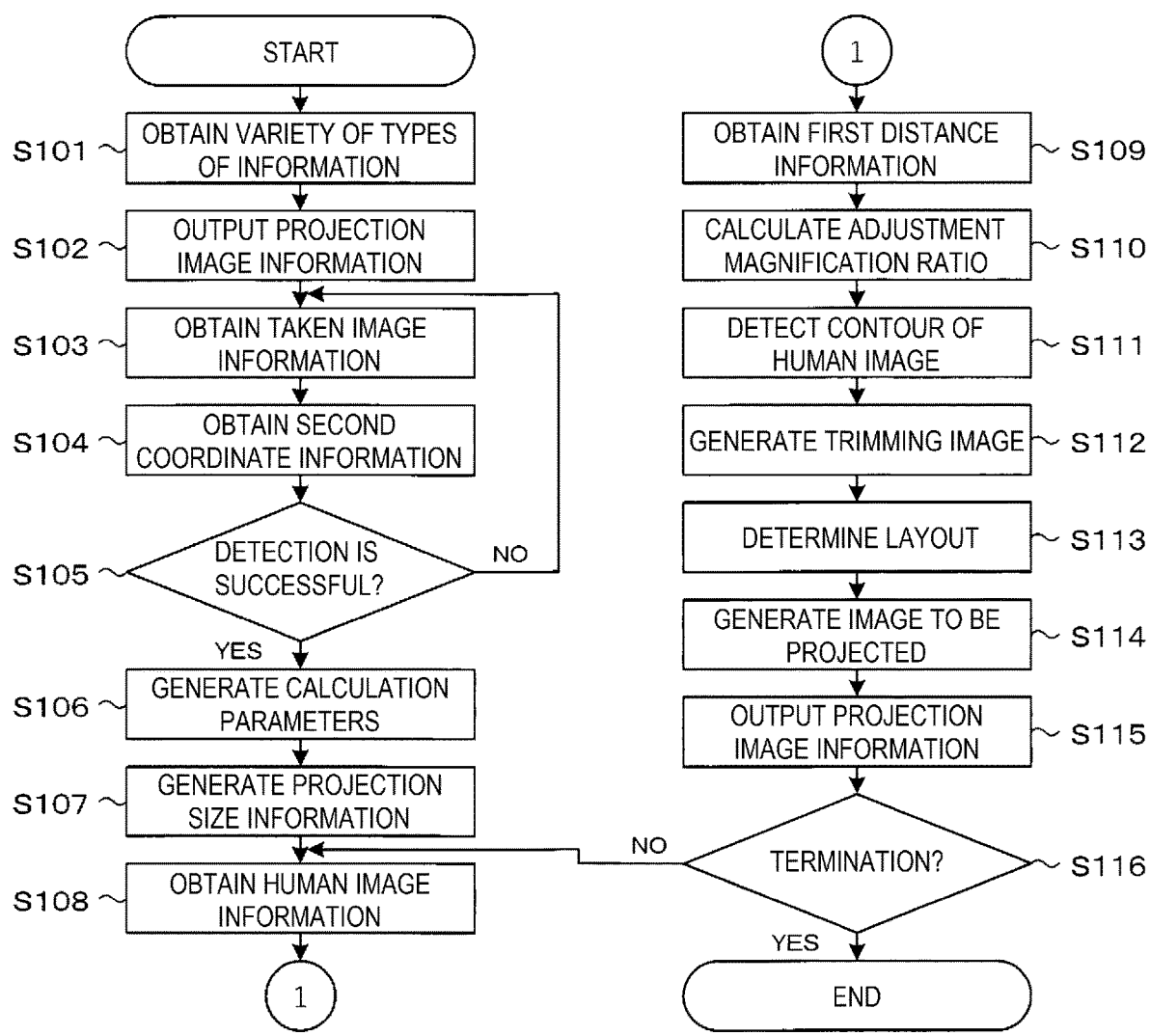
FIG. 15 is a flowchart for explaining an operation of a computer 1 according to the first embodiment.

FIG. 15 is a flowchart for explaining an operation of the computer 1 according to the first embodiment. A series of actions shown in the flowchart is started when, for example, the power of the computer 1 and the projector 5 is turned ON, and the operation device 14 receives the input operation related to a start of the operation from the user.

In the step S101, the acquisition unit 120 controls the communication device 18 to thereby obtain a variety of types of information from the external server coupled to the computer 1 so as to communicate with each other. Specifically, the acquisition unit 120 obtains the first projection image information 106 and the first coordinate information 109 from that external server. Further, the acquisition unit 120 makes the storage device 10 store the first projection image information 106 and the first coordinate information 109 thus obtained.

In the step S102, the projection controller 121 controls the communication device 18 to thereby output the first projection image information 106 to the projector 5. Specifically, the projection controller 121 makes the projection mechanism 56 provided to the projector 5 project the projection light based on the first projection image information 106 to thereby display the projection image GP1 on the wall surface W1. In other words, the projection controller 121 makes the projection mechanism 56 project the image GF1 represented by the first projection image information 106 to thereby display the projection image GP1 on the wall surface W1.

In the step S103, the acquisition unit 120 obtains the taken image information 102 output from the imaging element 542. Further, the acquisition unit 120 makes the storage device 10 store the taken image information 102 thus obtained.

In the step S104, the dot detector 123 executes the image processing on the image represented by the taken image information 102 to thereby detect the plurality of dots included in the image represented by the taken image information 102. Specifically, the dot detector 123 executes the image processing on the taken image GS1 represented by the taken image information 102 to thereby detect the plurality of dots included in the taken image GS1. In other words, the dot detector 123 obtains the second coordinate information 110 representing the coordinates of the plurality of dots included in the taken image GS1.

In the step S105, the dot detector 123 determines whether or not detection of the plurality of dots included in the image represented by the taken image information 102 is successful. Specifically, the dot detector 123 determines whether or not detection of the plurality of dots included in the taken image GS1 is successful. When the detection of the plurality of dots included in the image represented by the taken image information 102 is successful, namely YES is determined in the step S105, the dot detector 123 proceeds with the process to the step S106. Further, when the detection of the plurality of dots included in the image represented by the taken image information 102 is unsuccessful, namely NO is determined in the step S105, the dot detector 123 proceeds with the process to the step S103.

For example, it is possible for the dot detector 123 to compare the number of coordinates represented by the first coordinate information 109 and the number of coordinates represented by the second coordinate information 110 with each other. When the number of the coordinates represented by the first coordinate information 109 and the number of the coordinates represented by the second coordinate information 110 coincide with each other, it is possible for the dot detector 123 to determine that the detection of the plurality of dots included in the image represented by the taken image information 102 is successful.

Further, the image represented by the taken image information 102 blurs in some cases due to, for example, an unintended vibration caused at the timing when the camera 54 takes the projection image GP1 displayed on the wall surface W1. In such a case, it is unachievable in some cases for the dot detector 123 to detect the plurality of dots included in the image represented by the taken image information 102. In other words, when the plurality of dots included in the image represented by the taken image information 102 is not detected, the dot detector 123 can determine that the detection of the plurality of dots included in the image represented by the taken image information 102 is unsuccessful.

When it is determined that the detection of the plurality of dots included in the image represented by the taken image information 102 is unsuccessful, the processing device 12 obtains the taken image information 102 once again in the step S103. Further, in the step S104, the processing device 12 executes the image processing on the image represented by the taken image information 102 to thereby detect the plurality of dots included in the image represented by the taken image information 102 once again.

In the step S106, the size information generator 124 generates the calculation parameter 103 based on the second coordinate information 110, the position information 104, the first coordinate information 109, and the internal parameter 114.

In the step S107, the size information generator 124 generates the projection size information 101 based on the first coordinate information 109, the calculation parameter 103, and the internal parameter 114.

In the step S108, the acquisition unit 120 controls the communication device 18 to thereby obtain the human image information 130 from the terminal device coupled to the computer 1 so as to communicate with each other. Then, the acquisition unit 120 makes the storage device 10 store the human image information 130 thus obtained. Specifically, the acquisition unit 120 obtains the first human image information 131, the second human image information 132, and the third human image information 133 from a plurality of terminal devices coupled to the computer 1 so as to communicate with each other. Then, the acquisition unit 120 makes the storage device 10 store the first human image information 131, the second human image information 132, and the third human image information 133 thus obtained.

In the step S109, the dot detector 123 executes the image processing on the image GQ1 represented by the human image information 130 to thereby detect the dot located at the right eye of the human image GH1 included in the image GQ1, and the dot located at the left eye of the human image GH1. Then, the dot detector 123 calculates the distance between the dot located at the right eye of the human image GH1 and the dot located at the left eye of the human image GH1. In other words, the dot detector 123 obtains the first distance information 112 representing the distance between the dot located at the right eye of the human image GH1 and the dot located at the left eye of the human image GH1.

Specifically, in the step S109, the dot detector 123 executes the image processing on the image GQ11 represented by the first human image information 131 to thereby detect the dot DQ1 and the dot DQ2. Then, the dot detector 123 calculates the distance L6 between the dot DQ1 and the dot DQ2. Further, the dot detector 123 executes the image processing on the image GQ12 represented by the second human image information 132 to thereby detect the dot DQ3 and the dot DQ4. Then, the dot detector 123 calculates the distance L7 between the dot DQ3 and the dot DQ4. Further, the dot detector 123 executes the image processing on the image GQ13 represented by the third human image information 133 to thereby detect the dot DQ5 and the dot DQ6. Then, the dot detector 123 calculates the distance L8 between the dot DQ5 and the dot DQ6. In the present embodiment, the first distance information 112 includes the information representing the distance L6, the information representing the distance L7, and the information representing the distance L8.

In the step S110, the magnification ratio calculator 126 calculates an adjustment magnification ratio for adjusting the size of the human image GH1 based on the first distance information 112, the second distance information 113, the projection size information 101, and the generation size information 135. Specifically, the magnification ratio calculator 126 calculates the adjustment magnification ratio for adjusting the size of the human image GH11, the adjustment magnification ratio for adjusting the size of the human image GH12, and the adjustment magnification ratio for adjusting the size of the human image GH13 based on the first distance information 112, the second distance information 113, the projection size information 101, and the generation size information 135. In other words, the magnification ratio calculator 126 generates the magnification ratio information 136 representing the adjustment magnification ratio for adjusting the size of the human image GH1 based on the first distance information 112, the second distance information 113, the projection size information 101, and the generation size information 135.

In the step S111, the contour detector 127 executes the image processing on the image GQ1 to thereby detect the contour of the human image GH1 from the image GQ1. Specifically, the contour detector 127 executes the image processing on the image GQ11 to thereby detect the contour of the human image GH11 from the image GQ11. Further, the contour detector 127 executes the image processing on the image GQ12 to thereby detect the contour of the human image GH12 from the image GQ12. Further, the contour detector 127 executes the image processing on the image GQ13 to thereby detect the contour of the human image GH13 from the image GQ13.

In the step S112, the image generator 125 trims the image GQ1 based on the contour of the human image GH1 to thereby generate the trimming image GT including the human image GH1. Specifically, the image generator 125 trims the image GQ11 based on the contour of the human image GH11 to thereby generate the trimming image GT1 including the human image GH11. Further, the image generator 125 trims the image GQ12 based on the contour of the human image GH12 to thereby generate the trimming image GT2 including the human image GH12. Further, the image generator 125 trims the image GQ13 based on the contour of the human image GH13 to thereby generate the trimming image GT3 including the human image GH13.

In the step S113, the layout determination unit 128 determines the layout of the image GU based on the generation size information 135, the magnification ratio information 136, the number of the images constituting the image GU, and the type of the images constituting the image GU. Specifically, the layout determination unit 128 determines the layout of the image GU1 based on the generation size information 135, the magnification ratio information 136, the number of the images constituting the image GU1, and the type of the images constituting the image GU1. In other words, the layout determination unit 128 generates the layout information 137 for designating the layout of the image GU1 based on the generation size information 135, the magnification ratio information 136, the number of the images constituting the image GU1, and the type of the images constituting the image GU1.

In the step S114, the image generator 125 generates the image GU based on the image including the human image GH1, the image represented by the content image information 134, the magnification ratio information 136, and the layout information 137. Specifically, the image generator 125 generates the image GU1 based on the trimming image GT1, the trimming image GT2, the trimming image GT3, the content image GC11, the magnification ratio information 136, and the layout information 137. In other words, the image generator 125 generates the second projection image information 107 representing the image GU1 based on the trimming image GT1, the trimming image GT2, the trimming image GT3, the content image GC11, the magnification ratio information 136, and the layout information 137.

In the process of the generation of the image GU in the step S114, the image generator 125 adjusts the size of the human image GH1 based on the adjustment magnification ratio represented by the magnification ratio information 136 to thereby generate the image GQ2. In other words, the image generator 125 adjusts the size of the human image GH11 included in the trimming image GT1 based on the adjustment magnification ratio represented by the magnification ratio information 136 to thereby generate the image GQ21. Further, the image generator 125 adjusts the size of the human image GH12 included in the trimming image GT2 based on the adjustment magnification ratio represented by the magnification ratio information 136 to thereby generate the image GQ22. Further, the image generator 125 adjusts the size of the human image GH13 included in the trimming image GT3 based on the adjustment magnification ratio represented by the magnification ratio information 136 to thereby generate the image GQ23.

In the step S115, the projection controller 121 controls the communication device 18 to thereby output the second projection image information 107 to the projector 5. Specifically, the projection controller 121 makes the projection mechanism 56 provided to the projector 5 project the projection light based on the second projection image information 107 to thereby display the projection image GP2 on the wall surface W1. In other words, the projection controller 121 makes the projection mechanism 56 project the image GU1 represented by the second projection image information 107 to thereby display the projection image GP2 on the wall surface W1.

In the step S116, the input manager 122 determines whether or not an operation related to a termination of the operation is received from the user. When the operation related to the termination of the operation is received from the user, namely YES is determined in the step S116, the processing device 12 provided with the input manager 122 terminates the series of the actions shown in the flowchart of FIG. 15. Further, when the operation related to the termination of the operation is not received from the user, namely NO is determined in the step S116, the input manager 122 proceeds with the process to the step S108.

In this way, according to the first embodiment, the projection system Sys adjusts the size of the human image GH1 based on the dimensions of the projection image GP to thereby display the human image GH3 to be displayed on the projection surface in a desired size such as the life size. In other words, even when using the projector 5 in which the size of the projection image GP changes with the installation circumstances, it is possible for the user to easily display the human image GH3 in the desired size without finely adjusting the installation circumstances of the projector 5.

Further, according to the first embodiment, the projection system Sys adjusts the size of the human image GH1 based on the distance between the dot located at the right eye of the human image GH1 and the dot located at the left eye of the human image GH1. In other words, it is possible for the projection system Sys to accurately display the human image GH3 in the desired size by adjusting the size of the human image GH1 with reference to the distance between both eyes small in individual difference.

As described hereinabove, the projection method according to the first embodiment includes generating the projection size information 101 representing the size of the projection image GP1 displayed on the wall surface W1 based on the taken image information 102 output from the imaging element 542, obtaining the image GQ11 including the human image GH11 representing the person U1, generating the image GU1 including the image GQ21 which is obtained by adjusting the size of the human image GH11 based on the projection size information 101, and projecting the image GU1 to thereby displaying the projection image GP2 on the wall surface W1.

Further, the projection system Sys according to the first embodiment is provided with the processing device 12, the imaging element 542, and the projection mechanism 56, wherein the processing device 12 executes generating the projection size information 101 representing the size of the projection image GP1 displayed on the wall surface W1 based on the taken image information 102 output from the imaging element 542, obtaining the image GQ11 including the human image GH11 representing the person U1, generating the image GU1 including the image GQ21 which is obtained by adjusting the size of the human image GH11 based on the projection size information 101, and making the projection mechanism 56 project the image GU1 to thereby displaying the projection image GP2 on the wall surface W1.

Specifically, the projection system Sys adjusts the size of the human image GH1 based on the dimensions of the projection image GP to thereby display the human image GH3 to be displayed on the projection surface in a desired size. Thus, even when using the projector 5 in which the size of the projection image GP changes with the installation circumstances, it becomes unnecessary for the user to finely adjust the installation circumstances of the projector 5 in order to display the human image GH3 in the desired size.

It should be noted that in the first embodiment, the projection system Sys is an example of a "projection system," the processing device 12 is an example of a "processing device," the imaging element 542 is an example of a "sensor," the projection mechanism 56 is an example of a "projection mechanism," the taken image information 102 is an example of "information," the wall surface W1 is an example of a "projection surface," the projection image GP1 is an example of a "first projection image," the projection size information 101 is an example of "projection size information," the person U1 is an example of a "person," the human image GH11 is an example of a "first human image," the image GQ11 is an example of a "first image," the image GQ21 is an example of a "second image," the image GU1 is an example of a "third image," and the projection image GP2 is an example of a "second projection image." Further, the distance L1 is an example of a "dimensions of the first projection image."

Further, in the projection method according to the first embodiment, the projection image GP1 is displayed by the projection mechanism 56 projecting the image GF1 on the wall surface W1, the imaging element 542 is an image sensor provided to the camera 54 for taking the projection image GP1, and generating the projection size information 101 includes obtaining the first coordinate information 109 representing the coordinates of the dots DF1 through DF4 included in the image GF1, obtaining the taken image information 102 output from the imaging element 542 by taking the projection image GP1, obtaining the second coordinate information 110 representing the coordinates of the dots DV1 through DV4 which are included in the taken image GS1 represented by the taken image information 102, and which correspond one-to-one to the dots DF1 through DF4, and generating the projection size information 101 based on the position information 104 representing the positional relationship between the camera 54 and the projection mechanism 56, the first coordinate information 109, and the second coordinate information 110.

In other words, it is possible for the projection system Sys to calculate the dimensions of the projection image GP1 by using the camera 54 without using a special device such as a ToF sensor. Thus, it is possible for the projection system Sys to calculate the dimensions of the projection image GP1 at lower cost compared to when using the special device such as a ToF sensor. Here, ToF is an abbreviation for Time of Flight.

It should be noted that in the first embodiment, the image GF1 is an example of a "fourth image," the camera 54 is an example of a "camera," the dots DF1 through DF4 are an example of a "plurality of first dots," the first coordinate information 109 is an example of "first coordinate information," the taken image GS1 is an example of a "taken image," the dots DV1 through DV4 are an example of a "plurality of second dots," the second coordinate information 110 is an example of "second coordinate information," and the position information 104 is an example of "position information."

Further, in the projection method according to the first embodiment, the camera 54 and the projection mechanism 56 are disposed in the chassis 58, and the position information 104 is stored in advance in the storage device 10.

In other words, the position information 104 is information inherent in the device, and is constant. Further, the position information 104 is figured out in advance. Thus, it is possible for the user to omit the operation of obtaining the position information 104 which becomes necessary when calculating the dimensions of the projection image GP1.

It should be noted that in the first embodiment, the chassis 58 is an example a "chassis," and the storage device 10 is an example of a "storage device."

Further, in the projection method according to the first embodiment, the generating the image GU1 includes trimming the image GQ11 based on the contour of the human image GH11 to thereby generate the trimming image GT1 including the human image GH11, and adjusting the size of the trimming image GT1 to thereby generate the image GQ21.

In other words, it is possible for the projection system Sys to eliminate other portions than the human image GH1 from the image GQ1. Thus, it is possible for the projection system Sys to display the human image GH3 in an intensified manner.

It should be noted that in the first embodiment, the trimming image GT1 is an example of a "trimming image."

Further, in the projection method according to the first embodiment, the projection image GP2 includes the human image GH31 which is an image representing the person U1, and which corresponds to the human image GH11, and the generating the image GU1 includes obtaining the first distance information 112 representing the distance between the dot DQ1 and the dot DQ2 included in the human image GH11, and generating the image GQ21 by adjusting the size of the human image GH11 based on the second distance information 113 which is the information for designating the distance between two dots included in the human image GH31, and which designates the distance between the dot DQ13 corresponding to the dot DQ1 and the dot DQ14 corresponding to the dot DQ2, the first distance information 112, the projection size information 101, and the dimensions of the image GU1.

In other words, the projection system Sys adjusts the size of the human image GH1 based on the distance between the two dots included in the human image GH1. For example, the projection system Sys adjusts the size of the human image GH11 based on the distance between the dot DQ1 and the dot DQ2 included in the human image GH11. Thus, it is possible for the projection system Sys to accurately adjust the size of the human image GH1.

It should be noted that in the first embodiment, the human image GH31 is an example of a "second human image," the dot DQ1 is an example of a "third dot," the dot DQ2 is an example of a "fourth dot," the first distance information 112 is an example of "first distance information," the dot DQ13 is an example of a "fifth dot," the dot DQ14 is an example of a "sixth dot," and the second distance information 113 is an example of "second distance information." Further, the dimension of the image GU1 designated by the generation size information 135 is an example of a "dimension of the third image."

Further, in the projection method according to the first embodiment, the dot DQ1 is located at the right eye of the human image GH11, the dot DQ2 is located at the left eye of the human image GH11, the dot DQ3 is located at the right eye of the human image GH31, the dot DQ14 is located at the left eye of the human image GH31, and the generating the image GQ21 includes calculating the adjustment magnification ratio for adjusting the size of the human image GH11 based on the first distance information 112, the second distance information 113, the projection size information 101, and the dimension of the image GU1, and adjusting the size of the human image GH11 based on the adjustment magnification ratio to thereby generate the image GQ21.

In other words, the projection system Sys adjusts the size of the human image GH1 with reference to the distance between both eyes. Since the distance between both eyes is small in individual difference, it is possible for the projection system Sys to accurately display the human image GH3 in a desired size.

It should be noted that in the first embodiment, the adjustment magnification ratio represented by the magnification ratio information 136 is an example of an "adjustment magnification ratio."

Further, in the projection method according to the first embodiment, the image GU1 includes the content image GC21 showing the content disclosed to the user.

In other words, the projection system Sys projects the image GU1 to thereby display the content image GC31 corresponding to the content image GC21 on the wall surface W1. Thus, it is possible for the projection system Sys to disclose the content shown in the content image GC21 to the user.

It should be noted that in the first embodiment, the content image GC21 is an example of a "fifth image."

2. MODIFIED EXAMPLES

The embodiment described hereinabove can variously be modified. Specific aspects of modifications will hereinafter be illustrated. Further, two or more aspects arbitrarily selected from the following illustrations can arbitrarily be combined unless conflicting with each other. It should be noted that in each of the modified examples hereinafter illustrated, regarding the elements substantially the same in operation and function as those in the embodiment described above, the symbols used in the above description are diverted to arbitrarily omit the detailed description of each of such elements.

2.1. Modified Example 1

In the embodiment described above, there is illustrated the image GU1 shown in FIG. 14 as an example of the image GU, but the image GU is not limited to such an aspect. In other words, a variety of images constituting the image GU can be different from a variety of images constituting the image GU1. Further, the layout of the variety of images constituting the image GU can be different from the layout of the variety of images constituting the image GU1. For example, the image GQ21, the image GQ22, and the image GQ23 can be arranged above the content image GC21. Further, the image GQ21, the image GQ22, and the image GQ23 can be arranged at the right side of the content image GC21. Further, the image GQ21, the image GQ22, and the image GQ23 can be arranged at the left side of the content image GC21.

Figure 16:
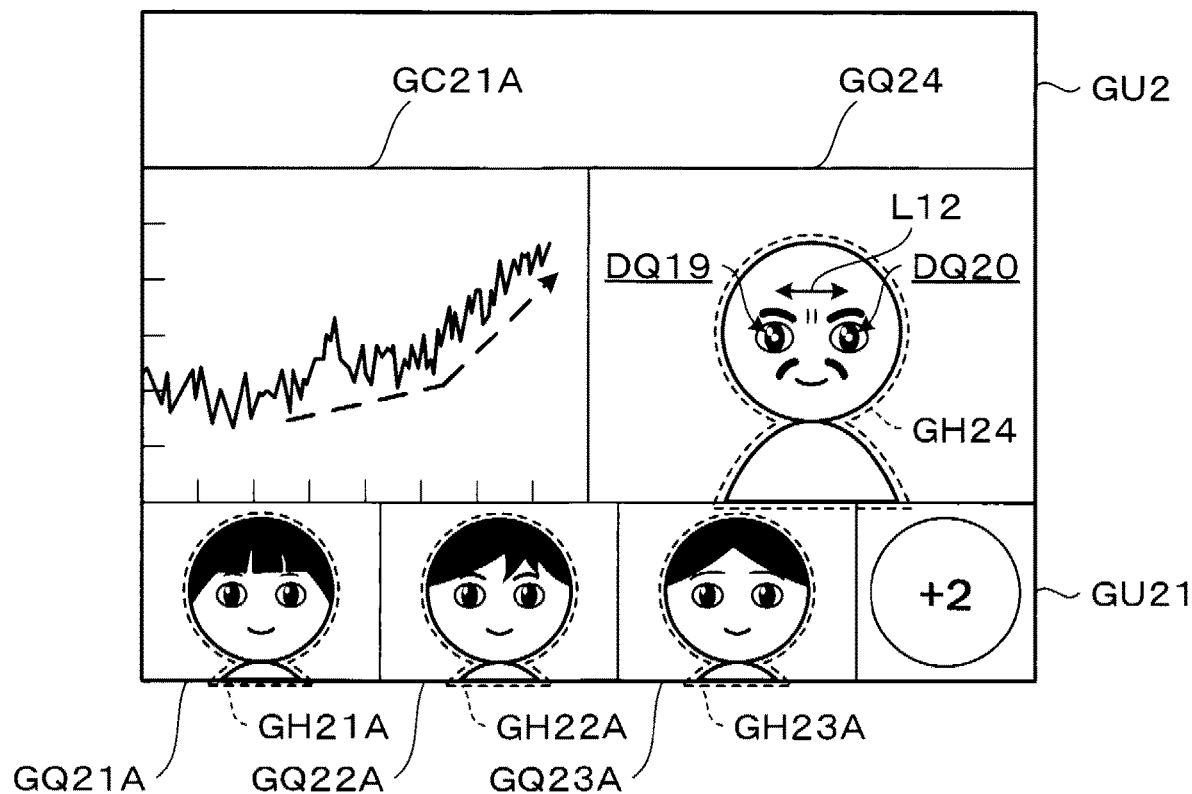
FIG. 16 is a schematic diagram illustrating another example of the image GU.

FIG. 16 is a schematic diagram illustrating another example of the image GU. The image GU2 is an example of the image GU. The image GU2 includes an image GQ21A, an image GQ22A, an image GQ23A, an image GQ24, a content image GC21A, and an image GU21. In other words, a variety of images constituting the image GU2 are different from a variety of images constituting the image GU1. Further, the layout of the variety of images constituting the image GU2 is different from the layout of the variety of images constituting the image GU1.

The image GQ21A is an image which is generated by adjusting the size of the trimming image GT1. In other words, the image GQ21A is an image corresponding to the image GQ21. The size of the image GQ21A is different from the size of the image GQ21. The image GQ21A includes a human image GH21A. The human image GH21A is an image corresponding to the human image GH21. Further, the human image GH21A is an image corresponding to the human image GH11. In other words, the human image GH21A is an image representing the person U1.

Since the size of the image GQ21A and the size of the image GQ21 are different from each other, the size of the human image GH21A differs from the size of the human image GH21. In other words, the human image GH21A is an image obtained by expanding or contracting the human image GH11 irrespective of the dimension of the projection image GP1.

The image GQ22A is an image which is generated by adjusting the size of the trimming image GT2. In other words, the image GQ22A is an image corresponding to the image GQ22. The size of the image GQ22A is different from the size of the image GQ22. The image GQ22A includes a human image GH22A. The human image GH22A is an image corresponding to the human image GH22. Further, the human image GH22A is an image corresponding to the human image GH12. In other words, the human image GH22A is an image representing the person U2.

Since the size of the image GQ22A and the size of the image GQ22 are different from each other, the size of the human image GH22A differs from the size of the human image GH22. In other words, the human image GH22A is an image obtained by expanding or contracting the human image GH12 irrespective of the dimension of the projection image GP1.

The image GQ23A is an image which is generated by adjusting the size of the trimming image GT3. In other words, the image GQ23A is an image corresponding to the image GQ23. The size of the image GQ23A is different from the size of the image GQ23. The image GQ23A includes a human image GH23A. The human image GH23A is an image corresponding to the human image GH23. Further, the human image GH23A is an image corresponding to the human image GH13. In other words, the human image GH23A is an image representing the person U3.

Since the size of the image GQ23A and the size of the image GQ23 are different from each other, the size of the human image GH23A differs from the size of the human image GH23. In other words, the human image GH23A is an image obtained by expanding or contracting the human image GH13 irrespective of the dimension of the projection image GP1.

The image GQ24 is an example of the image GQ2. The image GQ24 includes a human image GH24. The human image GH24 is an image representing a person different from the person U1, the person U2, and the person U3. The human image GH24 includes a dot DQ19 and a dot DQ20. The dot DQ19 is located at a right eye of the human image GH24. More specifically, the dot DQ19 is located at a pupil of the right eye of the human image GH24. The dot DQ20 is located at a left eye of the human image GH24. More specifically, the dot DQ20 is located at a pupil of the left eye of the human image GH24. It should be noted that a distance between the dot DQ19 and the dot DQ20 is hereinafter referred to as a distance L12. The distance L12 is represented in, for example, px.

In the image GU2, the distance L12 becomes a predetermined value. Specifically, the value of the distance L12 becomes equal to the values of the distance L9, the distance L10, and the distance L11. Specifically, in the projection image GP to be displayed on the wall surface W1 by the image GU2 being projected, a distance between a dot corresponding to the dot DQ19 and a dot corresponding to the dot DQ20 is set to a value designated by the second distance information 113, specifically to 63 mm.

The content image GC21A is an example of the content image GC2. The content image GC21A is an image corresponding to the content image GC11. Further, the content image GC21A is an image corresponding to the content image GC21. In other words, the content image GC21A is an image showing a content to be disclosed to the user.

The image GU21 is an image including a character string of "+2."

For example, when the processing device 12 obtains different pieces of the human image information 130 from the respective terminal devices, the image GU is not required to include the same number of images GQ2 as the number of the pieces of the human image information 130 thus obtained.

Specifically, it is possible for the image GU to include a smaller number of the images GQ2 than the number of the pieces of the human image information 130 thus obtained. Further, it is possible for the image GU to include an image which is obtained by adjusting the size of the human image GH1 based on a different magnification ratio from the adjustment magnification ratio represented by the magnification ratio information 136. Further, the image GU can include an image for exhibiting the number, which is obtained by subtracting the number of the images derived from the human image information 130 out of the plurality of images constituting the image GU from the number of the pieces of the human image information 130 thus obtained, to the user.

In the present modified example, there is assumed when the processing device 12 obtains the different pieces of the human image information 130 respectively from six terminal devices. In other words, the number of the pieces of the human image information 130 thus obtained is 6. The image GU2 includes the image GQ24 as the image GQ2. Further, the image GU2 includes the image GQ21A, the image GQ22A, and the image GQ23A as the images obtained by adjusting the size of the human image GH1 based on different magnification ratios from the adjustment magnification ratio represented by the magnification ratio information 136. Further, the image GU2 includes the image GU21 as the image for exhibiting the number, which is obtained by subtracting the number of the images derived from the human image information 130 out of the plurality of images constituting the image GU2 from the number of the pieces of the human image information 130 thus obtained, to the user. In other words, the image GU21 exhibits the fact that the number, which is obtained by subtracting the number of the images derived from the human image information 130 out of the plurality of images constituting the image GU2 from the number of the pieces of the human image information 130 obtained by the processing device 12, is "2" to the user. It should be noted that in the present modified example, the images derived from the human image information 130 out of the plurality of images constituting the image GU2 are the image GQ21A, the image GQ22A, the image GQ23A, and the image GQ24.

Further, the layout of the variety of images constituting the image GU can be determined based on other information obtained along with the human image information 130, specifically on audio data. For example, when a volume of a sound represented by the audio data is higher than a predetermined value, it is possible for the processing device 12 to arrange the image GQ2 derived from the human image information 130 obtained together with that audio data at the center of the image GU. Further, when the volume of the sound represented by the audio data is higher than a predetermined value, it is possible for the processing device 12 to arrange only the image derived from the human image information 130 obtained together with that audio data in the image GU as the image GQ2. Thus, it is possible to display the specific human image GH3 in an intensified manner.

2.2. Modified Example 2

In the embodiment and the modified example described above, there is illustrated when the camera 54 is disposed in the chassis 58, but the present disclosure is not limited to such an aspect. For example, it is possible for the camera 54 to be fixed to a place different from the chassis 58. It should be noted that when changing the positional relationship between the camera 54 and the projection mechanism 56, it is necessary to update the position information 104 depending on the circumstance.

2.3. Modified Example 3

In the embodiment and the modified examples described above, there is illustrated when the projection size information 101 is generated based on the taken image information 102 output from the imaging element 542 provided to the camera 54, but the present disclosure is not limited to such an aspect. For example, it is possible to generate the projection size information 101 using the ToF sensor instead of the camera 54. The ToF sensor outputs the information related to the distance from the ToF sensor to an object pixel by pixel. In other words, the coordinates of the plurality of dots included in the projection image GP1 are derived from the information output from the ToF sensor. Further, based on the coordinates of the plurality of dots, the projection size information 101 is generated. In this case, the ToF sensor is an example of a "sensor."

2.4. Modified Example 4

In the embodiment and the modified examples described above, there is illustrated when the projection system Sys is provided with the computer 1 and the projector 5, but the present disclosure is not limited to such an aspect. For example, by using a projector having substantially the same functions as those of the computer 1 and the projector 5 instead of the computer 1 and the projector 5, it is possible to make the configuration of the projection system according to the present disclosure simpler.

It should be noted that the projector having substantially the same functions as those of the computer 1 and the projector 5 can further be provided with a camera for taking an image of the user. By using two such projectors, it is possible for the user to obtain the image GQ1 including the human image GH1 representing other users, and at the same time, transmit the image GQ1 including the human image GH1 representing the user itself to the other users.

Further, in the projection system according to the present disclosure, the projector can have a part of the function of the computer 1. For example, it is possible for the projector to have a series of functions related to the generation of the projection size information 101. When the projector generates the projection size information 101, the projector outputs the projection size information 101 thus generated to the computer. The computer generates the image GU based on the projection size information 101 obtained from the projector. Further, it is possible for the projector to have a series of functions related to the generation of the image GQ2.

2.5. Modified Example 5

In the embodiment and the modified examples described above, there is illustrated when displaying the human image GH3 in life size with reference to the distance between both pupils of a human, but it is possible to display the human image GH3 in life size by adjusting the size of the human image GH1 with reference to, for example, a distance between both inner corners of eyes of a human. It is known that the distance between the both inner corners of eyes of a human is about 34 mm in average. Therefore, when the distance between the both inner corners of eyes of the human image GH3 in the projection image GP2 becomes about 34 mm by the size of the human image GH2 in the image GU being appropriately set, the human image GH3 is displayed in life size.

Further, in some cases, the positions of the eyes of a person represented by the human image GH1 cannot accurately be detected on the grounds that the person wears sunglasses or the like. In such a case, it is possible to obtain the first distance information 112 assuming that the eyes of that person are located at predetermined positions with reference to the central positions of lenses of the sunglasses. Further, the points to be the reference of the first distance information 112 and the second distance information 113 are not limited to the both eyes of the human image, and can be, for example, both corners of a mouth of the human image.

2.6. Modified Example 6

There is a case in which the points to be the reference of the first distance information 112 such as the points located at the eyes of the human image GH1 are not correctly detected such as when the human image GH1 included in the image GQ1 blurs, or when the human image GH1 is not included in the image GQ1. In such a case, it is possible for the projection controller 121 to make the projection mechanism 56 project an image different from the image GU instead of the image GU. It is possible for the projection controller 121 to make the projection mechanism 56 project an image including a message for notifying the user of the fact that the human image GH1 is not included in the image GQ1 such as "no one is present" specifically.

2.7. Modified Example 7

In the embodiment and the modified examples described above, there is illustrated when the human image GH1 is the image representing the person thus imaged, but the present disclosure is not limited to such an aspect. The human image GH1 can be, for example, computer graphics representing a person. Further, the human image GH1 can also be a painting representing a person.

2.8. Modified Example 8

It is possible to estimate the size of the human image GH1 included in the image GQ1 based on a field angle of a camera for taking an image of a person represented by the human image GH1, and a distance from that camera to the person. In other words, it is possible to obtain the first distance information 112 based on the human image information 130 representing the image GQ1, the information representing the field angle of the camera which takes the image of the person represented by the human image GH1, and the information representing the distance from that camera to the person. Thus, it is possible to omit the image processing related to the acquisition of the first distance information 112.

3. SUPPLEMENTARY NOTES

The conclusion of the present disclosure will hereinafter be described as supplementary notes.

3.1. Supplementary Note 1

A projection method including generating projection size information representing a dimension of a first projection image displayed on a projection surface based on information output from a sensor, obtaining a first image including a first human image representing a person, generating a third image including a second image which is obtained by adjusting a size of the first human image based on the projection size information, and projecting the third image to thereby display a second projection image on the projection surface.

Specifically, the projection system for realizing the projection method described in Supplementary Note 1 adjusts the size of the first human image based on the dimension of the first projection image to thereby display the image on the projection surface which represents a person, and which corresponds to the first human image, in a desired size. Thus, even when using the projector in which the size of the projection image changes with the installation circumstances, it becomes unnecessary for the user to finely adjust the installation circumstances of the projector in order to display the image on the projection surface which represents a person, and corresponding to the first human image in the desired size.

3.2. Supplementary Note 2

The projection method described in Supplementary Note 1, wherein the first projection image is displayed by a projection mechanism projecting a fourth image on the projection surface, the sensor is an image sensor provided to a camera configured to take the first projection image, and the generating the projection size information includes obtaining first coordinate information representing coordinates of a plurality of first dots included in the fourth image, obtaining taken image information output from the sensor by taking the first projection image, obtaining second coordinate information representing coordinates of a plurality of second dots which is included in a taken image represented by the taken image information, and which corresponds one-to-one to the plurality of first dots, and generating the projection size information based on position information representing a positional relationship between the camera and the projection mechanism, the first coordinate information, and the second coordinate information.

In other words, the projection system for realizing the projection method described in Supplementary Note 2 is capable of calculating the dimension of the first projection image by using the camera without using a special device such as a ToF sensor. Thus, it is possible for the projection system for realizing the projection method described in Supplementary Note 2 to calculate the dimensions of the first projection image at lower cost compared to when using the special device such as a ToF sensor.

3.3. Supplementary Note 3

The projection method described in Supplementary Note 2, wherein the camera and the projection mechanism are disposed in a chassis, and the position information is stored in advance in a storage device.

Specifically, in the projection system for realizing the projection method described in Supplementary Note 3, the position information representing the positional relationship between the camera and the projection mechanism is information inherent in the device, and is constant. Further, the position information is figured out in advance. Thus, it is possible for the user to omit the operation of obtaining the position information which becomes necessary when calculating the dimensions of the first projection image.

3.4. Supplementary Note 4

The projection method described in any one of Supplementary Note 1 through Supplementary Note 3, wherein the generating the third image includes trimming the first image based on a contour of the first human image to thereby generate a trimming image including the first human image, and adjusting a size of the trimming image to thereby generate the second image.

Specifically, it is possible for the projection system for realizing the projection method described in Supplementary Note 4 to eliminate other portions than the first human image from the first image. Thus, it is possible for the projection system for realizing the projection method described in Supplementary Note 4 to display the image on the projection surface which is an image representing a person, and which corresponds to the first human image in an intensified manner.

3.5. Supplementary Note 5

The projection method described in any one of Supplementary Note 1 through Supplementary Note 4, wherein the second projection image includes a second human image which is an image representing the person, and which corresponds to the first human image, and the generating the third image includes obtaining first distance information representing a distance between a third dot and a fourth dot included in the first human image, and generating the second image by adjusting the size of the first human image based on second distance information which is information for designating a distance between two dots included in the second human image, and which designates a distance between a fifth dot corresponding to the third dot and a sixth dot corresponding to the fourth dot, the first distance information, the projection size information, and a dimension of the third image.

Specifically, the projection system for realizing the projection method described in Supplementary Note 5 adjusts the size of the first human image based on the distance between the third dot and the fourth dot included in the first human information. Thus, it is possible for the projection system for realizing the projection method described in Supplementary Note 5 to accurately adjust the size of the first human image.

3.6. Supplementary Note 6

The projection method described in Supplementary Note 5, wherein the third dot is located at a right eye of the first human image, the fourth dot is located at a left eye of the first human image, the fifth dot is located at a right eye of the second human image, the sixth dot is located at a left eye of the second human image, and the generating the second image includes calculating an adjustment magnification ratio for adjusting the size of the first human image based on the first distance information, the second distance information, the projection size information, and the dimension of the third image, and adjusting the size of the first human image based on the adjustment magnification ratio to thereby generate the second image.

Specifically, the projection system for realizing the projection method described in Supplementary Note 6 adjusts the size of the first human image with reference to a distance between both eyes. Since the distance between both eyes is small in individual difference, it is possible for the projection system for realizing the projection method described in Supplementary Note 6 to accurately display the second human image on the projection surface which represents a person, and corresponding to the first human image in a desired size.

3.7. Supplementary Note 7

The projection method described in any one of Supplementary Note 1 through Supplementary Note 6, wherein the third image includes a fifth image showing a content disclosed to a user.

Specifically, the projection system for realizing the projection method described in Supplementary Note 7 projects the third image to thereby display an image which shows the content to be disclosed to the user, and which corresponds to the fifth image, on the projection surface. Thus, it is possible for the projection system for realizing the projection method described in Supplementary Note 7 to disclose the content shown in the fifth image to the user.

3.8. Supplementary Note 8

A projection system including a processing device, a sensor, and a projection mechanism, wherein the processing device executes generating projection size information representing a dimension of a first projection image displayed on a projection surface based on information output from the sensor, obtaining a first image including a first human image representing a person, generating a third image including a second image which is obtained by adjusting a size of the first human image based on the projection size information, and making the projection mechanism project the third image to thereby display a second projection image on the projection surface.

Specifically, the projection system described in Supplementary Note 8 adjusts the size of the first human image based on the dimension of the first projection image to thereby display the image on the projection surface which represents a person, and which corresponds to the first human image, in a desired size. Thus, even when using the projector in which the size of the projection image changes with the installation circumstances, it is possible for the user to easily display the image on the projection surface which represents a person, and which corresponds to the first human image in the desired size without finely adjusting the installation circumstances of the projector.

What is claimed is:
1. A projection method comprising:
generating projection size information representing a dimension of a first projection image displayed on a projection surface based on information output from a sensor;
obtaining a first image including a first human image representing a person;
generating a third image including a second image which is obtained by adjusting a size of the first human image based on the projection size information; and
projecting the third image to thereby display a second projection image on the projection surface, wherein
the generating the third image includes
trimming the first image based on a contour of the first human image to thereby generate a trimming image including the first human image, and adjusting a size of the trimming image to thereby generate the second image.

2. The projection method according to claim 1, wherein the first projection image is displayed by a projection mechanism projecting a fourth image on the projection surface,
the sensor is an image sensor provided to a camera configured to take the first projection image, and
the generating the projection size information includes
obtaining first coordinate information representing coordinates of a plurality of first dots included in the fourth image,
obtaining taken image information output from the sensor by taking the first projection image,
obtaining second coordinate information representing coordinates of a plurality of second dots which is included in a taken image represented by the taken image information, and which corresponds one-to-one to the plurality of first dots, and
generating the projection size information based on position information representing a positional relationship between the camera and the projection mechanism, the first coordinate information, and the second coordinate information.

3. The projection method according to claim 2, wherein the camera and the projection mechanism are disposed in a chassis, and
the position information is stored in advance in a storage device.

4. The projection method according to claim 1, wherein the second projection image includes a second human image which is an image representing the person, and which corresponds to the first human image, and
the generating the third image includes
obtaining first distance information representing a distance between a third dot and a fourth dot included in the first human image, and
generating the second image by adjusting the size of the first human image based on second distance information which is information for designating a distance between two dots included in the second human image, and which designates a distance between a fifth dot corresponding to the third dot and a sixth dot corresponding to the fourth dot, the first distance information, the projection size information, and a dimension of the third image.

5. The projection method according to claim 4, wherein the third dot is located at a right eye of the first human image,
the fourth dot is located at a left eye of the first human image,
the fifth dot is located at a right eye of the second human image,
the sixth dot is located at a left eye of the second human image, and
the generating the second image includes
calculating an adjustment magnification ratio for adjusting the size of the first human image based on the first distance information, the second distance information, the projection size information, and the dimension of the third image, and
adjusting the size of the first human image based on the adjustment magnification ratio to thereby generate the second image.

6. The projection method according to claim 1, wherein the third image includes a fifth image showing a content disclosed to a user.

7. A projection system comprising:
a processing device;
a sensor; and
a projection mechanism, wherein
the processing device executes
generating projection size information representing a dimension of a first projection image displayed on a projection surface based on information output from the sensor,
obtaining a first image including a first human image representing a person,
generating a third image including a second image which is obtained by adjusting a size of the first human image based on the projection size information, and
making the projection mechanism project the third image to thereby display a second projection image on the projection surface; and
the generating the third image includes
trimming the first image based on a contour of the first human image to thereby generate a trimming image including the first human image, and
adjusting a size of the trimming image to thereby generate the second image.

8. A projection method comprising:
generating projection size information representing a dimension of a first projection image displayed on a projection surface based on information output from a sensor;
obtaining a first image including a first human image representing a person;
generating a third image including a second image which is obtained by adjusting a size of the first human image based on the projection size information; and
projecting the third image to thereby display a second projection image on the projection surface, wherein
the second projection image includes a second human image which is an image representing the person, and which corresponds to the first human image, and
the generating the third image includes
obtaining first distance information representing a distance between a third dot and a fourth dot included in the first human image, and
generating the second image by adjusting the size of the first human image based on second distance information which is information for designating a distance between two dots included in the second human image, and which designates a distance between a fifth dot corresponding to the third dot and a sixth dot corresponding to the fourth dot, the first distance information, the projection size information, and a dimension of the third image.

9. The projection method according to claim 8, wherein the third dot is located at a right eye of the first human image,
the fourth dot is located at a left eye of the first human image,
the fifth dot is located at a right eye of the second human image,
the sixth dot is located at a left eye of the second human image, and
the generating the second image includes
calculating an adjustment magnification ratio for adjusting the size of the first human image based on the first distance information, the second distance information, the projection size information, and the dimension of the third image, and adjusting the size of the first human image based on the adjustment magnification ratio to thereby generate the second image.

\* \* \* \* \*